United States Patent
Wendel et al.

(10) Patent No.: US 10,757,320 B2
(45) Date of Patent: Aug. 25, 2020

(54) MULTIPLE OPERATING MODES TO EXPAND DYNAMIC RANGE

(71) Applicant: Waymo LLC, Mountain View, CA (US)

(72) Inventors: Andreas Wendel, Mountain View, CA (US); Jeremy Dittmer, Mountain View, CA (US); Brendan Hermalyn, San Francisco, CA (US); Benjamin Ingram, Santa Clara, CA (US)

(73) Assignee: Waymo LLC, Mountain View, CA (US)

(*) Notice: Subject to any disclaimer, the term of this patent is extended or adjusted under 35 U.S.C. 154(b) by 24 days.

(21) Appl. No.: 16/199,998

(22) Filed: Nov. 26, 2018

(65) Prior Publication Data

US 2019/0208111 A1   Jul. 4, 2019

Related U.S. Application Data

(60) Provisional application No. 62/611,206, filed on Dec. 28, 2017.

(51) Int. Cl.
| | |
|---|---|
| *H04N 5/235* | (2006.01) |
| *H04N 5/232* | (2006.01) |
| *H04N 5/225* | (2006.01) |

(52) U.S. Cl.
CPC ........ *H04N 5/23218* (2018.08); *H04N 5/2258* (2013.01); *H04N 5/2353* (2013.01); *H04N 5/2355* (2013.01)

(58) Field of Classification Search
CPC .................................................. H04N 5/2355
See application file for complete search history.

(56) References Cited

U.S. PATENT DOCUMENTS

| | | | |
|---|---|---|---|
| 5,101,276 | A | 3/1992 | Ohta |
| 5,929,908 | A | 7/1999 | Takahashi et al. |
| 7,126,630 | B1 | 10/2006 | Lee et al. |
| 7,133,069 | B2 | 11/2006 | Wallach et al. |

(Continued)

OTHER PUBLICATIONS

"High Dynamic Range from Multiple Images: Which Exposures to Combine?"; Michael D. Grossberg, et al.; Proc. ICCV Workshop on Color and Photometric Methods in Computer Vision (CPMCV); 2003.

(Continued)

*Primary Examiner* — Gary C Vieaux
(74) *Attorney, Agent, or Firm* — McDonnell Boehnen Hulbert & Berghoff LLP

(57) ABSTRACT

Example embodiments relate to multiple operating modes to expand dynamic range. An example embodiment includes a camera system. The camera system may include a first image sensor having a first dynamic range corresponding to a first range of luminance levels in a scene. The system may also include a second image sensor having a second dynamic range corresponding to a second range of luminance levels in the scene. The camera system may further include a processor coupled to the first image sensor and the second image sensor. The processor may be configured to execute instructions to identify objects of a first type in a first image of the scene captured by the first image sensor and identify objects of a second object type in a second image of the scene captured by the second image sensor.

20 Claims, 18 Drawing Sheets

(56) References Cited

U.S. PATENT DOCUMENTS

| | | | |
|---|---|---|---|
| 7,305,180 | B2 | 12/2007 | Labaziewicz et al. |
| 7,409,104 | B2 | 8/2008 | Vitsnudel et al. |
| 7,561,731 | B2 | 7/2009 | Wallace et al. |
| 8,885,978 | B2 | 11/2014 | Cote et al. |
| 9,086,486 | B2 | 7/2015 | Gilliland et al. |
| 9,420,151 | B2 | 8/2016 | Yokota |
| 9,420,198 | B2 | 8/2016 | Cote et al. |
| 2005/0046708 | A1 | 3/2005 | Lim et al. |
| 2006/0215882 | A1 | 9/2006 | Ando et al. |
| 2008/0029701 | A1 | 2/2008 | Onozawa et al. |
| 2008/0094486 | A1 | 4/2008 | Fuh et al. |
| 2008/0149812 | A1 | 6/2008 | Ward et al. |
| 2008/0199069 | A1 | 8/2008 | Schick et al. |
| 2008/0218612 | A1 | 9/2008 | Border et al. |
| 2008/0218613 | A1 | 9/2008 | Janson et al. |
| 2008/0219654 | A1 | 9/2008 | Border et al. |
| 2009/0096937 | A1 | 4/2009 | Bauer et al. |
| 2009/0225173 | A1* | 9/2009 | Ogawa ............... G06K 9/00362 348/207.99 |
| 2009/0245649 | A1* | 10/2009 | Nakatsuka ......... G06K 9/00248 382/195 |
| 2010/0238327 | A1 | 9/2010 | Griffith et al. |
| 2012/0314069 | A1 | 12/2012 | Taylor |
| 2014/0132769 | A1* | 5/2014 | Kido ................. G06K 9/00791 348/148 |
| 2015/0077581 | A1 | 3/2015 | Baltz et al. |
| 2015/0350510 | A1 | 12/2015 | Han |
| 2016/0019429 | A1* | 1/2016 | Ishigaki ............. G01B 11/026 348/47 |
| 2016/0176348 | A1* | 6/2016 | Vaghefinazari ......... B60R 1/00 348/148 |

OTHER PUBLICATIONS

"Split Aperture Imaging for High Dynamic Range"; Manoj Aggarwal, et al.; pp. 10-17, vol. 2; Proceedings Eighth IEEE International Conference on Computer Vision. ICCV; 2001.

http://www.ovt.com/sensors/OV10650; retrieved Nov. 27, 2017.

https://www.embedded-vision.com/platinum-members/apical/embedded-vision-training/documents/pp./hdr-sensors-embedded-vision; retrieved Dec. 29, 2017; archived on Internet archive on Jul. 8, 2017.

"Getting Started with Long Exposure Photography and ND Filters," retrieved from https://photofocus.com/2014/08/19/getting-started-with-long-exposure-photography-and-nd-filters/; Nicole S. Young; Aug. 19, 2014.

International Search Report and Written Opinion for PCT/US18/63332 dated Mar. 27, 2019.

* cited by examiner

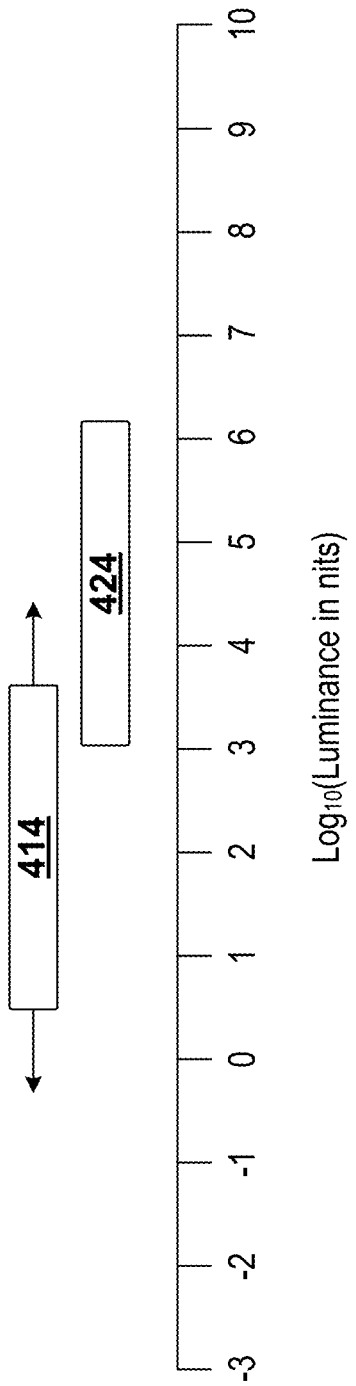

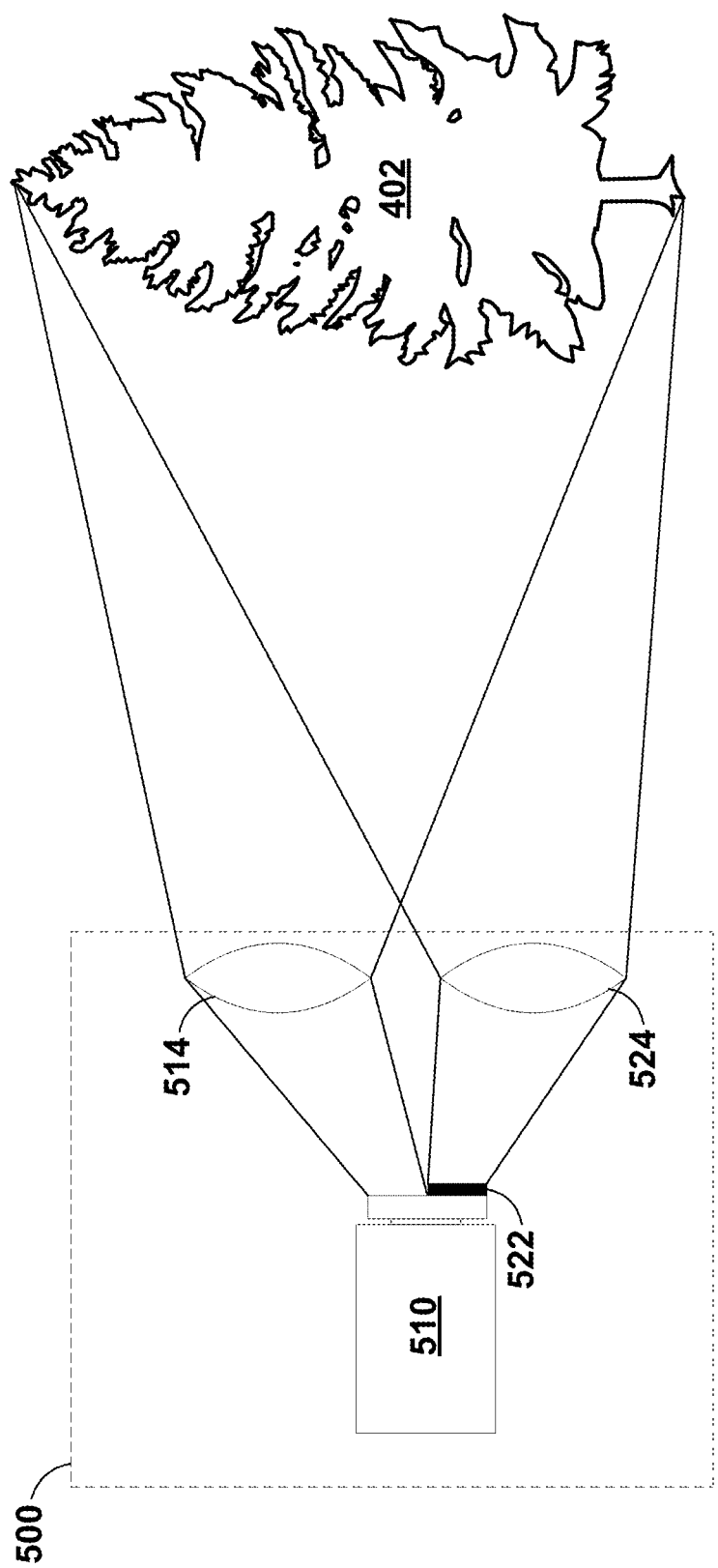

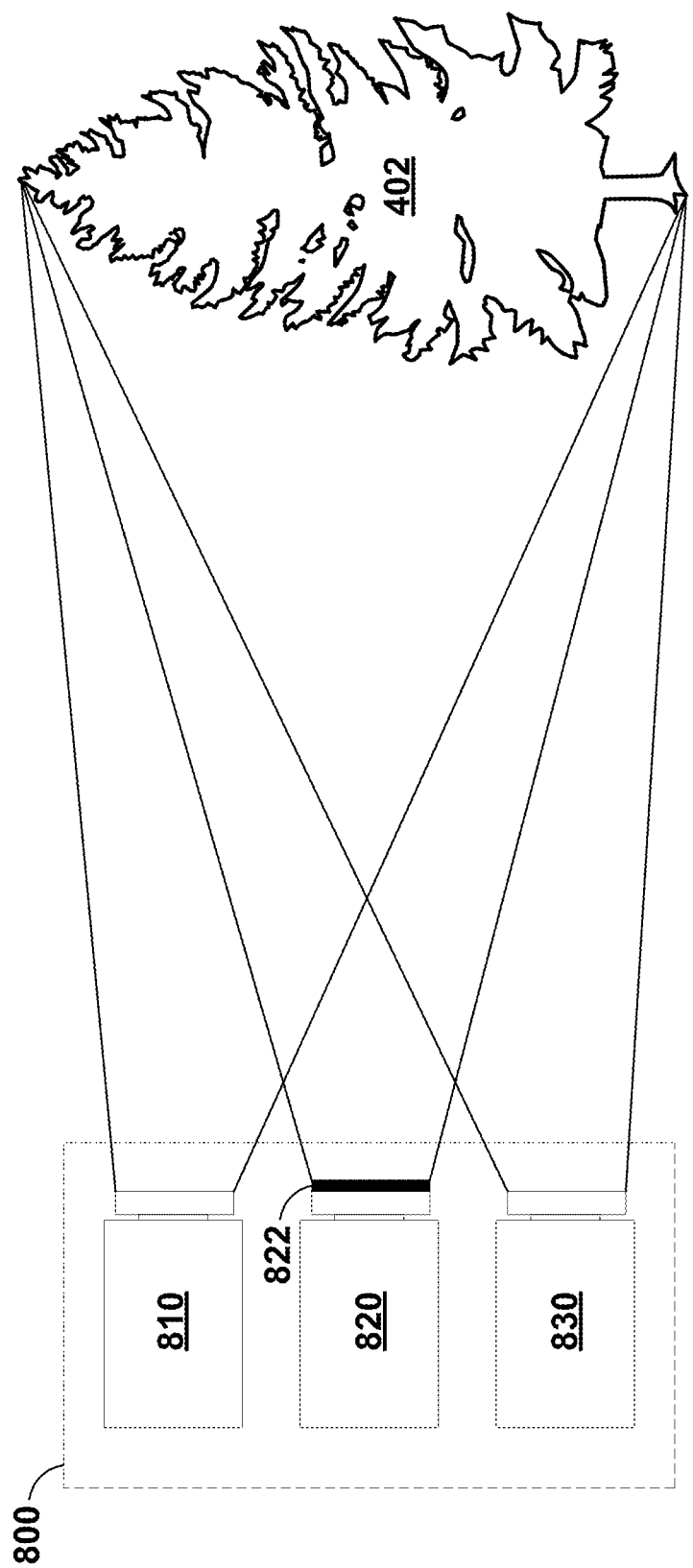

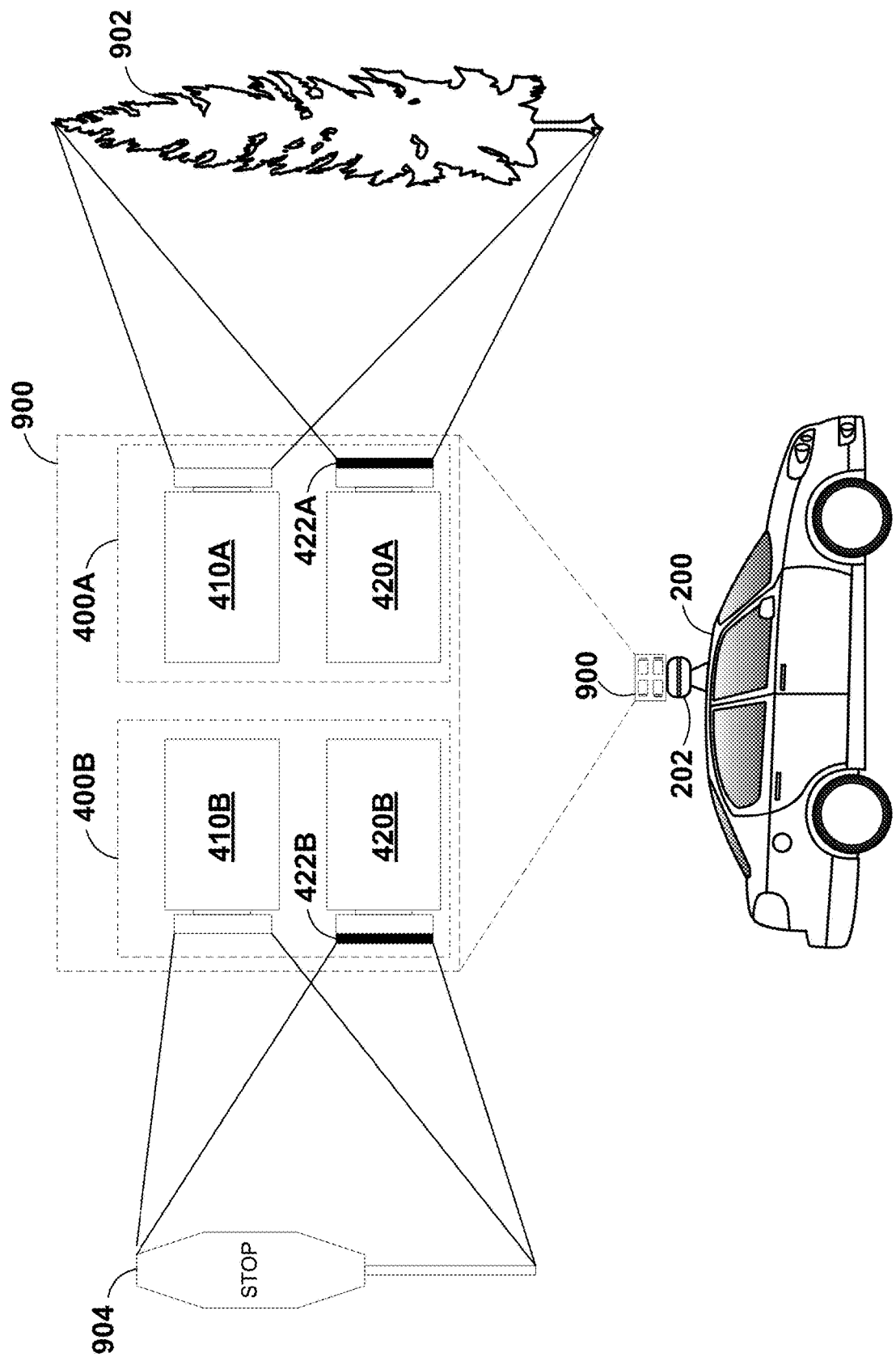

MULTIPLE OPERATING MODES TO EXPAND DYNAMIC RANGE

CROSS-REFERENCE TO RELATED APPLICATIONS

The present application hereby incorporates by reference U.S. patent application Ser. No. 15/613,546, which claims priority to U.S. Provisional Patent Application No. 62/508,467. The present application also claims priority to U.S. Provisional Patent Application No. 62/611,206 filed on Dec. 28, 2017, the contents of which are hereby incorporated by reference.

BACKGROUND

Cameras and image sensors are devices used to capture images of a scene. Some cameras (e.g., film cameras) chemically capture an image on film. Other cameras (e.g., digital cameras) electrically capture image data (e.g., using a charge-coupled device (CCD) or complementary metal-oxide-semiconductor (CMOS) sensors). Images captured by cameras can be analyzed to determine their contents. For example, a processor may execute a machine-learning algorithm in order to identify objects in a scene based on a library of previously classified objects that includes objects' shapes, colors, sizes, etc. (e.g., such a machine-learning algorithm can be applied in computer vision in robotics or other applications).

Cameras can have a variety of features that can distinguish one camera from another. For example, cameras and/or images captured by cameras may be identified by values such as aperture size, f-number, exposure duration/shutter speed, depth of field, focal length, International Organization for Standardization (ISO) sensitivity (or gain), pixel size, sensor resolution, exposure distance, etc. These features may be based on the lens, the image sensor, and/or additional facets of the camera. Further, these features may also be adjustable within a single camera (e.g., the aperture of a lens on a camera can be adjusted between photographs).

Some applications benefit from cameras that have a wide dynamic range. For example, the luminance of the brightest object (e.g., the sun at the middle of the day or emergency vehicle lights) and the luminance of the darkest object (e.g., a black cat in the middle of the night) may vary by orders of magnitude from one another (e.g., range from $10^5$ nits to $10^{-2}$ nits, i.e., $10^5$ cd/m$^2$ to $10^{-2}$ cd/m$^2$). Being able to capture images at both ends of such a wide dynamic range may be important for navigation and object detection and avoidance in autonomous vehicles, for example. A wide dynamic range may be difficult to achieve in autonomous vehicle applications because of vehicle motion. For example, if the vehicle is moving at a relatively high velocity, the exposure duration may be kept relatively short to prevent motion blur, thereby limiting the maximum exposure duration. In addition, if a certain range of luminance values is not captured by an image sensor with an adequate exposure setting, colors within images can be distorted (e.g., reds can appear as yellows in saturated captured images when the red channel saturates and starts clipping). Flares, glare, or other forms of aberrant light can also impair the quality of captured images.

SUMMARY

Example systems and methods may allow for an expansion of dynamic range using multiple operating modes. By using multiple image sensors with different exposure settings, a larger dynamic range can be achieved. In one embodiment, one image sensor (e.g., including an associated neutral-density filter) may have a fixed exposure setting that does not vary regardless of the brightness of a scene, whereas another image sensor may have a variable exposure setting that changes based on the brightness of the scene. Images captured by the first image sensor and the second image sensor can then be fed into an object-recognition algorithm executed by a processor. Certain types of objects may be more readily identifiable in one of the two images captured. For example, bright objects (e.g., actively illuminated objects) may be overexposed in the "light image," but properly exposed in the "dark image," and therefore easier to identify in the "dark image." By having two or more images that span a wider dynamic range than any single image, object identification and avoidance (e.g., within an autonomous vehicle) can be improved. Additional applications of using two cameras with different exposure settings and perspectives are also described herein.

In one aspect, a camera system is provided. The camera system includes a first image sensor having a first dynamic range corresponding to a first range of luminance levels in a scene. The camera system also includes a second image sensor having a second dynamic range corresponding to a second range of luminance levels in the scene. The second image sensor receives light from the scene via a neutral-density filter. The second range of luminance levels includes luminance levels that are higher than the first range of luminance levels. Further, the camera system includes a processor coupled to the first image sensor and the second image sensor. The processor is configured to execute instructions to identify objects of a first object type in a first image of the scene captured by the first image sensor. The first object type has an expected luminance within the first range of luminance levels. The processor is also configured to execute instructions to identify objects of a second object type in a second image of the scene captured by the second image sensor. The second object type has an expected luminance within the second range of luminance levels.

In another aspect, a method is provided. The method includes capturing, by a first image sensor having a first dynamic range corresponding to a first range of luminance levels in a scene, a first image of the scene. The method also includes capturing, by a second image sensor having a second dynamic range corresponding to a second range of luminance levels in the scene, a second image of the scene. The second image sensor captures the second image of the scene via a neutral-density filter. The second range of luminance levels includes luminance levels that are higher than the first range of luminance levels. Further, the method includes identifying, by a processor coupled to the first image sensor and the second image sensor, a first object of a first object type in the first image. The first object type has an expected luminance within the first range of luminance levels. In addition, the method includes identifying, by the processor, a second object of a second object type in the second image. The second object type has an expected luminance within the second range of luminance levels.

In yet another aspect, a non-transitory, computer-readable medium with instructions stored thereon is proved. The instructions, when executed by a processor, include receiving, from a first image sensor having a first dynamic range corresponding to a first range of luminance levels in a scene, a first image of the scene. The first image of the scene was captured by the first image sensor. The instructions, when executed by a processor, also include receiving, from a second image sensor having a second dynamic range corresponding to a second range of luminance levels in the scene, a second image of the scene. The second image of the scene was captured by the second image sensor via a neutral-density filter. The second range of luminance levels includes luminance levels that are higher than the first range of luminance levels. Further, the instructions, when executed by a processor, include identifying a first object of a first object type in the first image. The first object type has an expected luminance within the first range of luminance levels. In addition, the instructions, when executed by a processor, include identifying a second object of a second object type in the second image. The second object type has an expected luminance within the second range of luminance levels.

In still another aspect, a system is provided. The system includes a means for capturing, by a first image sensor having a first dynamic range corresponding to a first range of luminance levels in a scene, a first image of the scene. The system also includes a means for capturing, by a second image sensor having a second dynamic range corresponding to a second range of luminance levels in the scene, a second image of the scene. The second image sensor captures the second image of the scene via a neutral-density filter. The second range of luminance levels includes luminance levels that are higher than the first range of luminance levels. Further, the system includes a means for identifying, by a processor coupled to the first image sensor and the second image sensor, a first object of a first object type in the first image. The first object type has an expected luminance within the first range of luminance levels. In addition, the system includes a means for identifying, by the processor, a second object of a second object type in the second image. The second object type has an expected luminance within the second range of luminance levels.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 4B is an illustration of the dynamic range of a camera system, according to example embodiments.

FIG. 5 is an illustration of a camera system, according to example embodiments.

FIG. 8A is an illustration of a camera system, according to example embodiments.

FIG. 9A is an illustration of a camera system, according to example embodiments.

DETAILED DESCRIPTION

Figure 1:
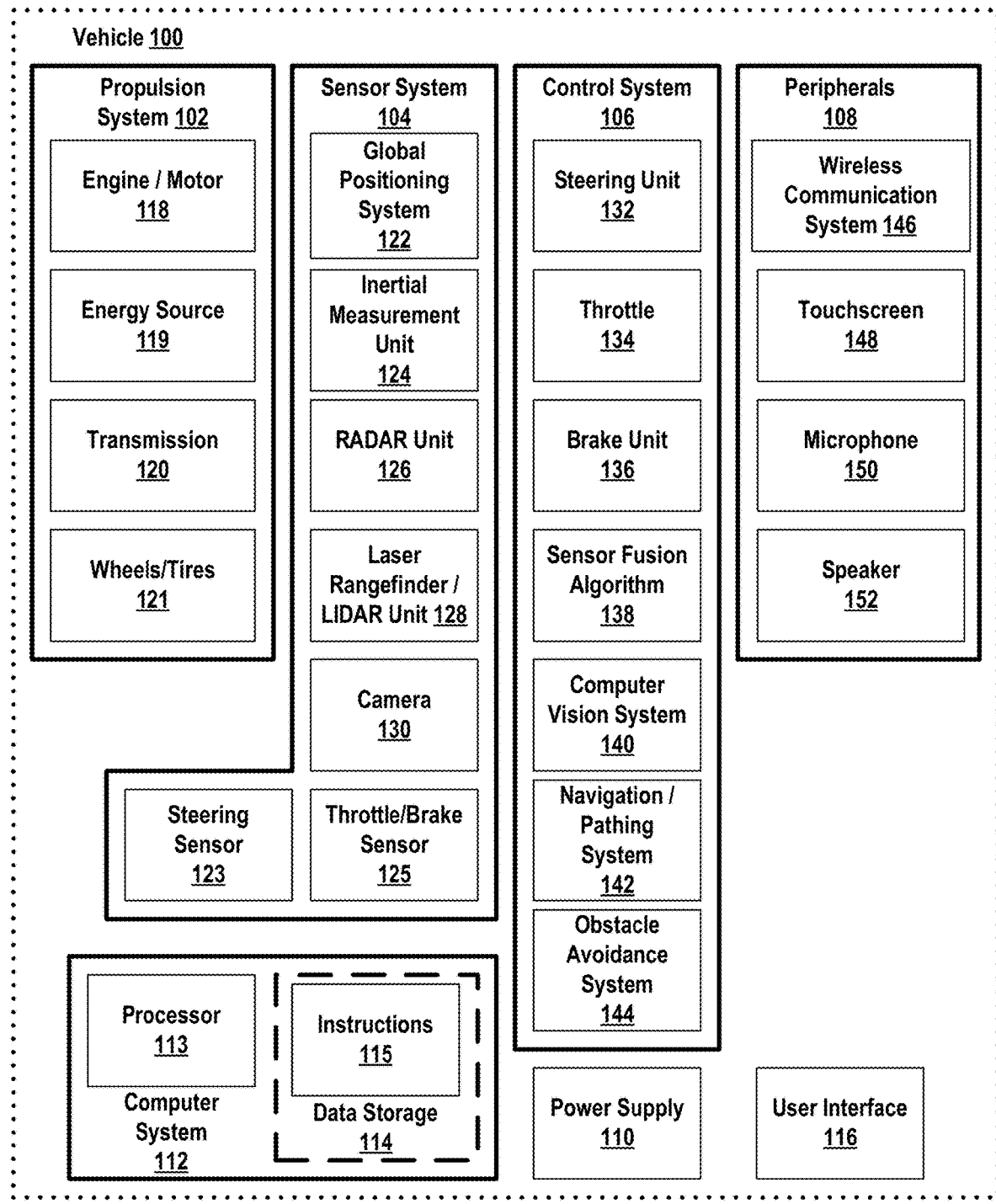
FIG. 1 is a functional block diagram illustrating a vehicle, according to example embodiments.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. Further, some of the illustrated elements may be combined or omitted. Yet further, an example embodiment may include elements that are not illustrated in the figures.

I. OVERVIEW

Example embodiments relate to a set of two image sensors (or more in some embodiments). The image sensors may be aligned vertically (e.g., one on top of another), in some embodiments. The image sensors may capture different images of the same scene. In some embodiments, the different images may be captured simultaneously. Further, a first image sensor may have a variable exposure level (e.g., an auto-exposure setting on a camera where a camera controller determines an appropriate exposure level and manipulates a shutter speed, a lens aperture, and/or an ISO sensitivity to achieve the determined appropriate exposure level), whereas a second image sensor may have a fixed (i.e., predefined) exposure level (e.g., based on a shutter speed, an aperture size, and an ISO sensitivity). Due to the variable exposure level, the first image sensor may be able to adjust to an appropriate exposure level based on ambient light level (e.g., day vs. night).

Because the first image sensor has a variable exposure level and the second image sensor has a fixed exposure level, each of the image sensors may be able to subsample different temporal domains. For example, the variable exposure level may correspond to a variable exposure duration (e.g., based on an adjustable shutter speed), whereas the fixed exposure level may correspond to a fixed exposure duration (e.g., based on a predefined shutter speed). If each image sensor has a different exposure duration, certain events may only be captured by one of the image sensors. For example, a fast moving object (e.g., a car traveling at 70 miles-per-hour, mph) may only be identifiable using an image captured by an image sensor with a sufficiently short exposure duration because image blur will occur in an image sensor with a longer exposure duration. However, a blinking object (e.g., a pulse-width modulated source, such as a road sign or a tail light) may only be captured by the image sensor with the longer exposure duration because an image sensor with a short exposure duration may miss the time in which the blinking object is illuminated.

Since the longer exposure duration corresponds to a longer capture time, the probability that the longer exposure duration captures the blinking object is greater than the shorter exposure duration. In some cases, given a sufficiently long exposure duration (e.g., an exposure duration that is longer than the period associated with a minimum frequency used in a blinking object, e.g, the road sign), capturing the blinking display can be deemed a certainty. This minimum, or lower bound, frequency may be a frequency that is used to help or ensure that humans do not perceive the blinking. In many cases, a short exposure duration may correspond to a negligible detection probability. For example, a vehicle tail light may be pulse-width modulated (PWM) at 100 Hz at a 1% duty cycle. If trying to sense the vehicle tail light with a randomly timed 0.5 ms exposure duration, there might be only a 6% chance that any portion of the active PWM period would overlap with the exposure. To exacerbate the problem, though, exposure frequencies associated with image sensors are not typically randomly timed. Thus, there is a non-zeroprobability that an image sensor would lock into an exposure cadence in which the PWM-driven lights are imaged less than 6% of the time (e.g., never imaged).

Additionally or alternatively, one of the image sensors (e.g., the second image sensor) may include an optical element that limits the illuminance corresponding to the scene captured by that image sensor (e.g., a neutral-density filter, a color filter, a polarizer, etc.). In some embodiments, rather than multiple image sensors, a single image sensor with multiple, independent sensor regions may be used (e.g., multiple image sensor regions each including a plurality of pixels, where the number of pixels in an image sensor region corresponds to a sensitivity of the corresponding image sensor region). In some embodiments, a single image sensor having multiple image sensor regions may include regions of pixels of varying sizing, in addition to or instead of regions of varying numbers of pixels.

In embodiments having three image sensors, the third image sensor may have a variable exposure level that is different from the variable exposure level of the first image sensor (e.g., an auto-exposure setting on the third image sensor may be determined by a camera controller such that the exposure level of the third image sensor is different than the first image sensor, and the camera controller may manipulate a shutter speed/exposure duration, an aperture size, and/or an ISO sensitivity to achieve the determined exposure level of the third image sensor). For example, the exposure duration of the third image sensor may be higher than the exposure duration of the first image sensor so the third image sensor is more sensitive to low luminance objects in the scene.

In embodiments having two image sensors, after the first image sensor captures a first image of the scene and the second image sensor captures a second image of the scene, a processor executing instructions may perform image analysis (e.g., based on a machine-learning algorithm trained using a library of images) to identify one or more objects present in the first image and/or the second image. In some embodiments, the objects identified using the first image may be within a first luminance range and the objects identified using the second image may be within a second luminance range. The second luminance range may be, at least partially, higher than the first luminance range. A higher luminance range may be achieved by using a neutral-density filter or by altering exposure settings to dim the scene so that brighter objects are made identifiable while dimmer objects may be made unidentifiable.

Similarly, in the image that is produced from the image sensor without a neutral-density filter, the exposure level may be increased (e.g., by increasing the predefined aperture size, shutter speed/exposure duration, or ISO sensitivity). As such, while objects of high luminance may be overexposed/washed out in the corresponding image, objects with lower luminance (e.g., a black cat on a dark road at night) may be identifiable.

Such a technique of identifying different types of objects in the two images (e.g., bright vs. dark objects) may save computation time and/or increase the number of objects that can be identified overall. For example, the processor may use a machine-learned model (e.g., deep convolutional neural network) to perform object identification in each of the two images, either individually or in combination. In order to save computation time, the processor may only attempt to identify actively illuminated objects (e.g., tail lights, traffic lights, light-emitting diode (LED) road signs, etc.) in the darker image (e.g., the second image arising from the second image sensor that has a corresponding neutral-density filter) and may only attempt to identify passively illuminated objects (e.g., objects illuminated by reflecting or refracting light, such as pedestrians, trees, stop signs, animals, etc.), objects illuminated from ambient light, and/or non-illuminated objects in the brighter image (e.g., the first image arising from the first image sensor).

In addition to the two-image-sensor scheme described above, one or more additional image sensors can be added (either with or without a neutral-density filter). The additional image sensors can capture additional images of the same scene using additional exposure settings. In this way, luminance values of objects in the additional images may be in additional luminance ranges (e.g., partially or wholly above the second luminance range, partially or wholly below the first luminance range, partially or wholly in between the second luminance range and the first luminance range, or partially or wholly overlapping the first and/or second luminance ranges). This may allow additional objects of even more extreme luminance values to be readily identifiable by the processor using images captured by the sets of image sensors.

In some embodiments, there may be multiple image sensors in a camera system. For example, in one embodiment, there may be multiple sets of sensors mounted around an autonomous or semi-autonomous vehicle. The sensors may face in different directions, in some embodiments. Each set may be used to identify objects that are disposed in a given perspective of a scene based on the orientation of a respective set of sensors. Further, some of the image sensor subsystems around the autonomous vehicle may only include two image sensors, whereas others include three image sensors. For instance, three front-facing image sensor subsystems (e.g., those facing at 0°, −45°, and 45° in yaw, where 0° is straight ahead) may include three image sensors to better identify objects on the road ahead, whereas the rest of the image sensor subsystems may only include two image sensors to conserve computational resources.

In addition to the advantages described above, a two image sensor system for object identification may have additional advantages. For example, because a scene is being captured from at least two slightly different perspectives, certain error corrections may be performed (e.g., by the processor executing instructions). One correction may include determining whether or not an object has been falsely identified. For example, an object may have a luminance that places it in an identifiable range using both the first image and the second image. If the object is identifiable using both images, but is only identified in one of the two images or identified to be a different object depending on which image is used for the identification, a redundancy system (e.g., a voting system or a system involving Bayesian inference) may be implemented to determine whether the object was actually present in the scene or which of the two identified object possibilities is more likely to be accurate. If an object is ultimately determined to be present or absent in the scene, this may indicate that something is wrong with one of the image sensors (e.g., a lens is cracked or dirty, the image sensor is broken, the scene is occluded by debris on the image sensor, etc.). After detecting that something is wrong with one of the image sensors, such an issue could be accounted for or corrected.

Additionally or alternatively, a first image sensor and a second image sensor may each be associated with different focal lengths (e.g., using an astigmatic lens or multiple lenses). As such, the two images captured by the two image sensors may have different focal lengths. These two images can then be used to determine the distance from the image sensors to one or more objects in the scene (e.g., based on which objects are or are not in focus in each image).

In addition to being used to determine distance, the two images could be composited or otherwise combined to simulate images that have an intermediate focal length between the two actual focal lengths. Using other optical elements disposed in front of one of the two image sensors could also interrogate other features of the scene/environment (e.g., color could be interrogated using chromatic filters or polarization using polarizing filters).

In still other embodiments, because the two or more image sensors may be positioned at slightly differing locations (e.g., one slightly above the other), the perspectives of the two image sensors relative to the scene are slightly different. This can be used to correct for stray light and scatter arising due to artifacts in the scene itself. For example, if the sun is directly behind an object to be identified, an image captured of that object may be blown out, overexposed, distorted, or saturated due to the presence of the sun. However, from a slightly different perspective of the scene, the sun may be far enough removed from the position of the object, that it is not an issue. As such, the image with the sun not located behind the object can be used to identify the object. Other examples of stray light and scatter that may be accounted for using multiple perspectives include louvers from actively illuminated sources (e.g., tail lights or traffic lights) or obscuration (e.g., arising from an obstruction blocking an object from being viewed from a particular perspective of the scene).

II. EXAMPLE VEHICLE SYSTEMS AND OPERATIONS

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/ LIDAR 128, camera 130, steering sensor 123, and throttle/ brake sensor 125, among other possible sensors. In some embodiments, sensor system 104 may also include sensors configured to monitor internal systems of the vehicle 100 (e.g., $O_2$ monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

Figure 2:
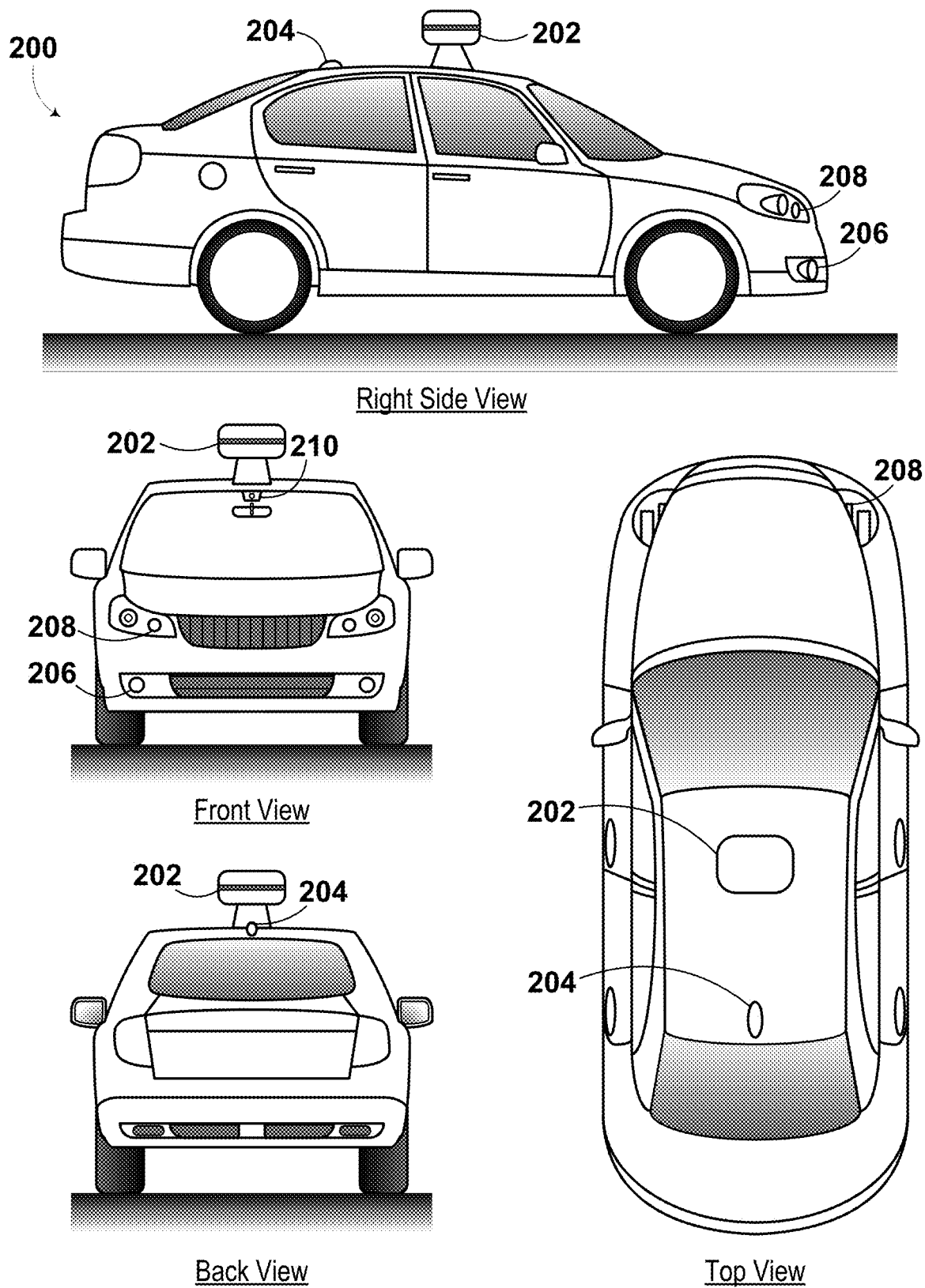
FIG. 2 is an illustration of a physical configuration of a vehicle, according to example embodiments.

FIG. 2 depicts an example physical configuration of vehicle 200, which may represent one possible physical configuration of vehicle 100 described in reference to FIG. 1. Depending on the embodiment, vehicle 200 may include sensor unit 202, wireless communication system 204, radio unit 206, deflectors 208, and camera 210, among other possible components. For instance, vehicle 200 may include some or all of the elements of components described in FIG. 1. Although vehicle 200 is depicted in FIG. 2 as a car, vehicle 200 can have other configurations within examples, such as a truck, a van, a semi-trailer truck, a motorcycle, a golf cart, an off-road vehicle, or a farm vehicle, among other possible examples.

Sensor unit 202 may include one or more sensors configured to capture information of the surrounding environment of vehicle 200. For example, sensor unit 202 may include any combination of cameras, radars, LIDARs, range finders, radio devices (e.g., Bluetooth and/or 802.11), and acoustic sensors, among other possible types of sensors. In some embodiments, sensor unit 202 may include one or more movable mounts operable to adjust the orientation of sensors in sensor unit 202. For example, the movable mount may include a rotating platform that can scan sensors so as to obtain information from each direction around the vehicle 200. The movable mount of sensor unit 202 may also be moveable in a scanning fashion within a particular range of angles and/or azimuths.

In some embodiments, sensor unit 202 may include mechanical structures that enable sensor unit 202 to be mounted atop the roof of a car. Additionally, other mounting locations are possible within examples.

Wireless communication system 204 may have a location relative to vehicle 200 as depicted in FIG. 2, but can also have different locations within embodiments. Wireless communication system 200 may include one or more wireless transmitters and one or more receivers that may communicate with other external or internal devices. For example, wireless communication system 204 may include one or more transceivers for communicating with a user's device, other vehicles, and roadway elements (e.g., signs, traffic signals), among other possible entities. As such, vehicle 200 may include one or more vehicular communication systems for facilitating communications, such as dedicated short-range communications (DSRC), radio frequency identification (RFID), and other proposed communication standards directed towards intelligent transport systems.

Camera 210 may have various positions relative to vehicle 200, such as a location on a front windshield of vehicle 200. As such, camera 210 may capture images of the environment of vehicle 200. As illustrated in FIG. 2, camera 210 may capture images from a forward-looking (front-facing) view with respect to vehicle 200, but other mounting locations (including movable mounts) and viewing angles of camera 210 are possible within embodiments. For instance, camera 210 could be positioned within the vehicle so that the camera captures images of the environment of vehicle 200 through a windshield of vehicle 200.

In some examples, camera 210 may correspond to one or more visible light cameras. Alternatively or additionally, camera 210 may include infrared sensing capabilities. Camera 210 may also include optics that may provide an adjustable field of view. Other examples are also possible.

Figure 3:
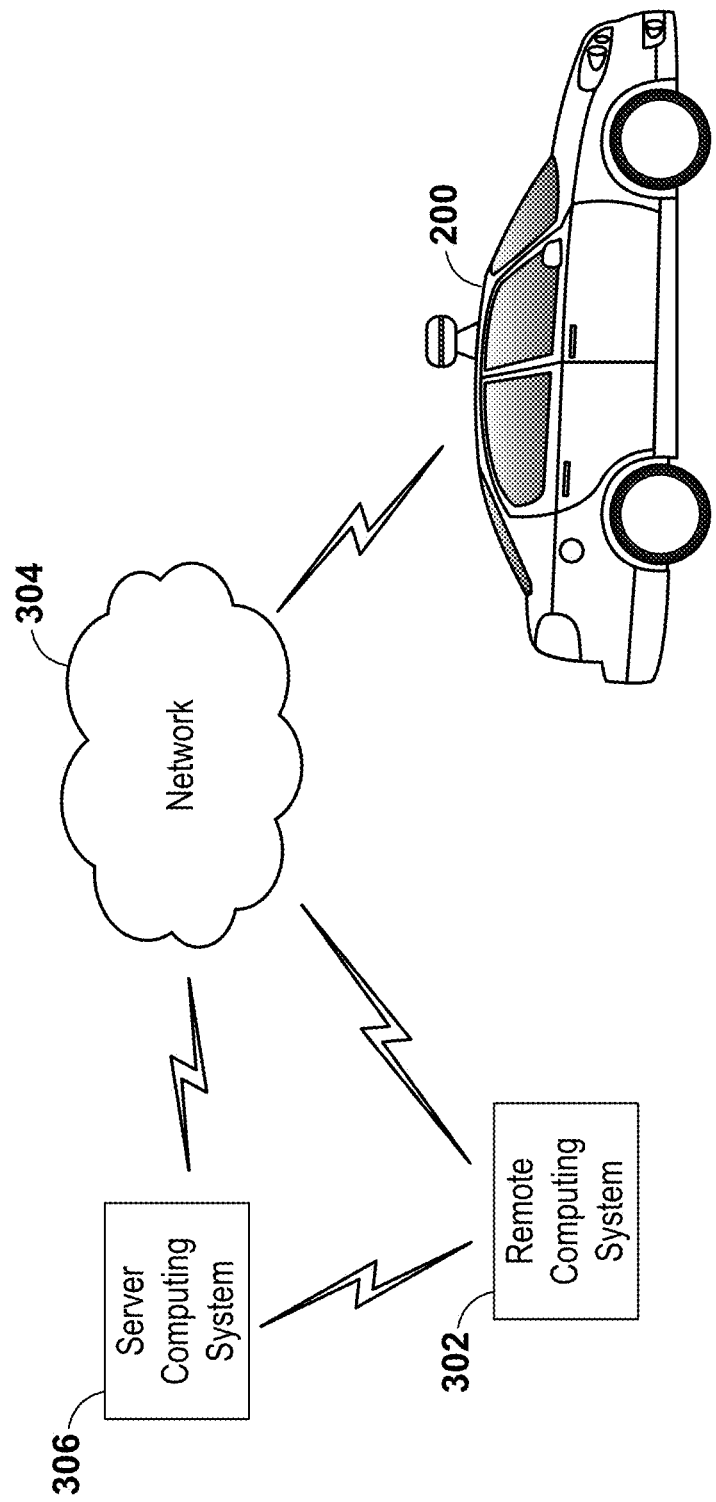
FIG. 3 is a conceptual illustration of wireless communication between various computing systems related to an autonomous vehicle, according to example embodiments.

FIG. 3 is a conceptual illustration of wireless communication between various computing systems related to an autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous mode that enables a control system to safely navigate vehicle 200 between destinations using sensor measurements. When operating in an autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, or perhaps server computing system 306, or a computing system local to vehicle 200) may operate to use a camera to capture images of the environment of an autonomous vehicle. In general, at least one computing system will be able to analyze the images and possibly control the autonomous vehicle.

In some embodiments, to facilitate autonomous operation a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distance and position to various reflecting objects may be determined. In some embodiments, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., light, such as that from a gas or diode laser, or other possible light source) that will be reflected by a target objects near the vehicle. The laser range finder may be able to capture the reflected electromagnetic (e.g., laser) signals. The captured reflected electromagnetic signals may enable the range-finding system (or processing system) to determine a range to various objects. The range-finding system may also be able to determine a velocity or speed of target objects and store it as environment data.

Additionally, in an example, a microphone may be configured to capture audio of environment surrounding the vehicle. Sounds captured by the microphone may include emergency vehicle sirens and the sounds of other vehicles. For example, the microphone may capture the sound of the siren of an emergency vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the environment of the vehicle. For example, the processing system may combine data from both radar information and a captured image to determine if another vehicle or pedestrian is in front of the autonomous vehicle. In other embodiments, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one embodiment, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various way depending on the source of the environment data. In some embodiments, the environment data may come from a camera and be image or video data. In other embodiments, the environment data may come from a LIDAR unit. The vehicle may analyze the captured image or video data to identify objects in the image or video data. The methods and apparatuses may be configured to monitor image and/or video data for the presence of objects of the environment. In other embodiments, the environment data may be radar, audio, or other data. The vehicle may be configured to identify objects of the environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the environment, it may also calculate a confidence associated with the specific detected object. The confidence may be calculated in various ways depending on the embodiment. In one example, when detecting objects of the environment, the vehicle may compare environment data to predetermined data relating to known objects. The closer the match between the environment data to the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

III. EXAMPLE IMAGE SENSING SYSTEMS

Figure 4A:
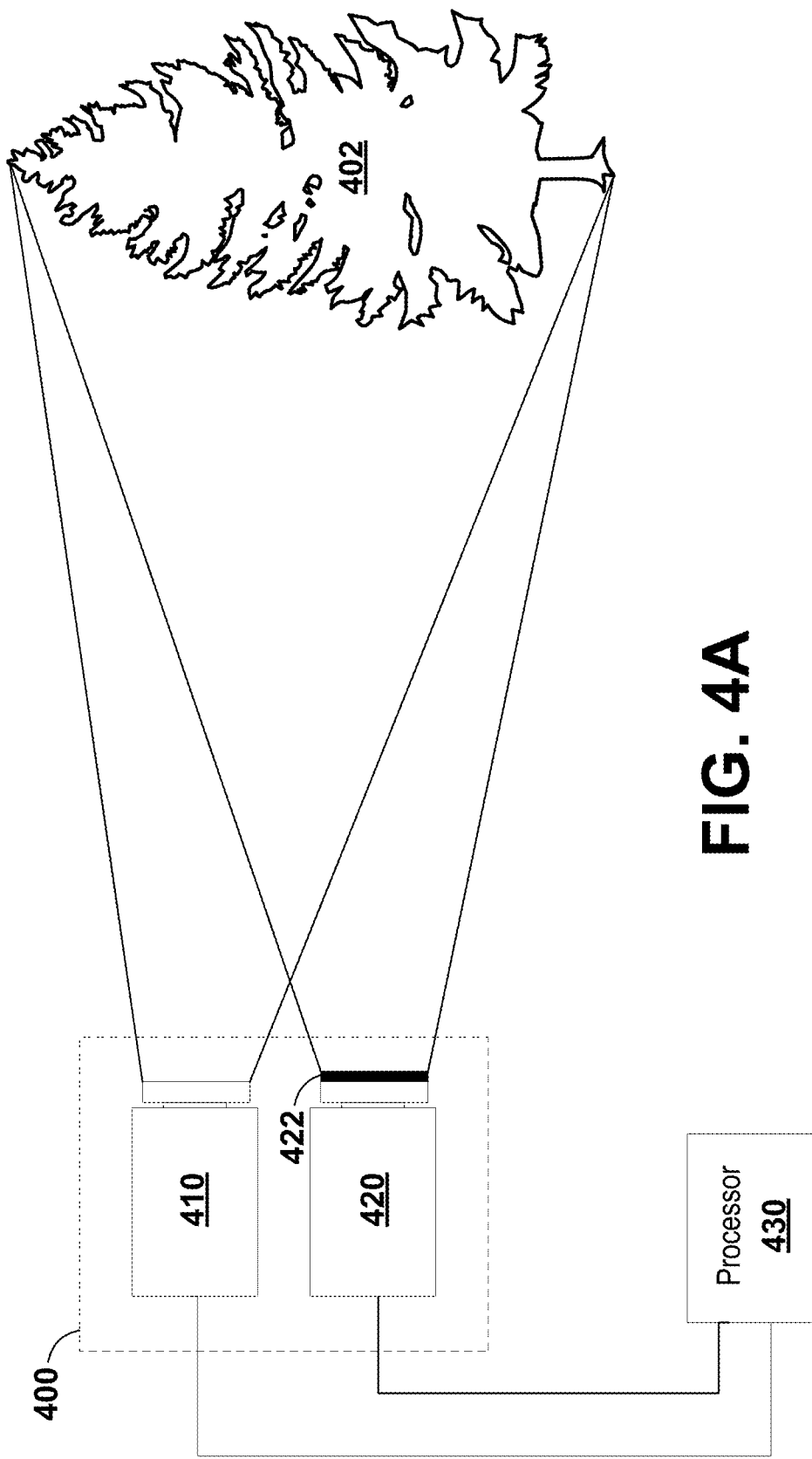
FIG. 4A is an illustration of a camera system, according to example embodiments.

In addition to or alternative to the camera 130, the computer vision system 140, the sensor unit 202, and/or the camera 210, or perhaps as a portion of the camera 130, the computer vision system 140, the sensor unit 202, and/or the camera 210, example vehicles may include one or more camera systems 400, as illustrated in FIG. 4A. The camera system 400 may be used by an autonomous vehicle for object detection and avoidance, as well as navigation. As illustrated in FIG. 4A, the camera system 400 may include a first image sensor 410 and a second image sensor 420. The first image sensor 410 and the second image sensor 420 may be configured to capture images of a scene 402. Further, the first image sensor 410 and the second image sensor 420 may be individually communicatively coupled to a processor 430. In alternate embodiments, there may be a single communicative coupling between the processor 430 and the camera system 400 rather than individual communicative couplings between the processor 430 and each of the first image sensor 410 and the second image sensor 420.

The scene 402 may include one or more objects identifiable by a processor executing instructions in order to analyze images captured by the first image sensor 410 and the second image sensor 420 to detect objects. As used throughout, an object may include any subset of that which is present in a scene. For example, an object may include a vehicle (e.g., an ambulance), a portion of a vehicle (e.g., a tire, a door, a windshield, etc.), a feature of nature (e.g., a tree, a squirrel, grass, a cloud, rain, snow, etc.), a portion of a feature of nature (e.g., a trunk, a squirrel's head, etc.), a sign (e.g., a stop sign, a construction sign, a speed limit sign, etc.), a marking on the road (e.g., a center line or a shoulder of a road), a word (e.g., "STOP"), a portion of a word (e.g., a letter, such as "S"), or any other component of a scene which is identifiable via any of a myriad of object-recognition algorithms as disclosed herein or as understood by those having skill in the art. Each of the objects may have a corresponding luminance level (i.e., a brightness level). For example, the luminance level of a traffic light may be higher than the luminance level of a black cat. Luminance levels may be measured in units of candelas per square meter, for instance. Further, the entire scene may be defined by a composite luminance level (e.g., in candelas per square meter or in nits). The composite luminance level may be a sum, median, maximum, or given percentile (e.g., ninetieth percentile) of the luminance values of all objects within the scene 402. Alternatively, the composite luminance level may be a sum, median, maximum, or given percentile (e.g., ninetieth percentile) of the luminance values of all objects within a specific region of the scene 402. Further, in some embodiments, one or more objects within the scene 402 may have more than one luminance value (e.g., different luminance values for different parts of the object). For example, a bike equipped with retroreflectors may have one luminance value for the the retroreflectors (e.g., a high luminance value) and another luminance value for the rest of the bike (e.g., a lower luminance value).

Further, some objects within the scene 402 may be actively illuminated. Actively illuminated objects are objects that, themselves, produce light that is used to observe the object. For example, street lights, tail lights, traffic lights, emergency flashers, illuminated road signs (e.g., a temporary construction sign), etc. may all include actively illuminated objects. Objects that are actively illuminated may produce light intermittently (e.g., according to a pulse-width modulation). One example is a construction sign that is sequentially illuminating letters on the sign to spell out a word. Another example may be a construction sign or other sign that illuminates letters and/or symbols in a random or pseudo-random succession (e.g., random in on a pixel-by-pixel basis or on a symbol-by-symbol basis). Other examples include overhead speed signs or electronic no-right-turn displays. The pulse-width modulation of an actively illuminated object may have an associated modulation time that is a similar or slower rate than the shutter speed (and corresponding exposure duration) of a corresponding image sensor. In such a way, an illumination portion of the pulse-width modulation (i.e., the "on" portion of a duty cycle) may not be entirely captured within an image captured at the associated shutter speed/exposure duration. For example, for an object actively illuminated at 10 Hz with a 1% duty cycle, an image sensor that captures images at a rate of 10 Hz with an exposure duration of 10 ms might never capture the "on" portion of the 1% duty cycle if the image sensor is out of phase with the actively illuminated object.

However, if the pulse-width modulation of an actively illuminate object has an associated modulation time that is faster than the shutter speed (and corresponding exposure duration) of a corresponding image sensor (e.g., an order of magnitude faster than the shutter speed/exposure duration, 10% faster than the shutter speed/exposure duration, 1% faster than the shutter speed/exposure duration, etc.), the pulse-width modulation period may be entirely captured within an image captured at the associated shutter speed (and corresponding exposure duration). For example, if the shutter speed/exposure duration of an image sensor is slower than the modulation speed of a construction sign that is sequentially illuminating letters on the sign to spell out a word, the entire word might be captured within an image captured by an image sensor having the slower shutter speed/exposure duration.

Additionally or alternatively, some objects within the scene 402 may be passively illuminated. Passively illuminated objects are objects that do not produce light used to observe the object. Instead, passively illuminated objects may reflect light generated by other sources (e.g., the sun, headlights, street lights, etc.). For example, reflectors, rocks, trees, railings, poles, bushes, pedestrians, animals, center-lines, roads, reflective road signs (e.g., a stop sign), vehicles without their lights on (e.g., during daytime travel), etc. may all include passively illuminated objects.

Independent of whether an object within the scene 402 is actively or passively illuminated, objects may be in motion relative to the camera system 400. Such objects may have a high velocity relative to the shutter speed/exposure duration (e.g., a speed such that a photo taken of the object will appear blurry for a given corresponding shutter speed/exposure duration) or a low or comparable velocity relative to the shutter speed/exposure duration (e.g., a speed such that a photo taken of the object will not appear blurry for a given corresponding shutter speed/exposure duration).

As illustrated, the second image sensor 420 may capture an image of the scene 402 via an optical neutral-density filter 422 (e.g., an ND2, ND4, ND8, ND16, ND32, ND64, ND100, ND128, ND128, ND256, ND400, ND512, ND1024, ND2048, ND4096, ND6310, ND8192, ND10000, or ND100000 filter). The neutral-density filter 422 may reduce the intensity of light from the scene 402 reaching the second image sensor 420 (e.g., by only transmitting a fraction of the light incident on the neutral-density filter 422). The neutral-density filter 422 may uniformly (or approximately uniformly) reduce the intensity of light reaching the second sensor 420 across the range of wavelengths that are sensed by the image sensor 420. For example, in the case that sensor 420 is configured to sense wavelengths in the visible spectrum, each wavelength in the visible spectrum from the scene 402 may be reduced in intensity by the same or substantially the same amount/percentage before reaching the second image sensor 420. This is different from a chromatic optical filter where some wavelengths are attenuated more than others. For example, in a monochromatic optical filter, only a narrow range of wavelengths corresponding to a given color (e.g., orange or 527 nm±10 nm) may be transmitted by the filter.

In alternate embodiments, the camera system 400 may include additional neutral-density filters or other filters (e.g., graduated neutral-density filters, chromatic optical filters, or polarizing filters). Further, in some embodiments, the camera system 400 may include additional or alternative fixed mechanisms of reducing the intensity of light reaching the second image sensor 420 other than a neutral-density filter or other optical filter. For example, a fixed aperture or a fixed sensitivity setting of an image sensor may be used instead of a neutral-density filter or other optical filter.

In still other embodiments, the second image sensor 420 may not include fixed mechanisms of reducing the intensity of light reaching the second image sensor 420. For example, the exposure of the second image sensor 420 may be varied based on prior data about the scene being captured. For example, if the camera system 400 is imaging a traffic light that has very high brightness or very low brightness (e.g., as indicated by the prior data), the exposure settings of the second image sensor 420 may be set accordingly. The adjustment of the exposure settings based on the prior data could be in addition to or instead of adjustment of the exposure settings of the second image sensor 420 based on ambient light within the scene. Other non-fixed methods of varying the exposure settings of the second image sensor 420 are also possible.

Also as illustrated in FIG. 4A, the first image sensor 410 and the second image sensor 420 may be aligned vertically with one another. In this way, the orientation of the objects within the scene 402 may be the same or approximately the same for an image captured by the first image sensor 410 as for an image captured by the second image sensor 420. In some embodiments, the vertical separation between the first image sensor 410 and the second image sensor 420 may be minimized, such that the perspective of the first image sensor 410 and the perspective of the second image sensor 420 are maximally similar. Further, in some embodiments, the first image sensor 410 and the second image sensor 420 may be configured to capture images substantially simultaneously. Additionally or alternatively, the first image sensor 410 and the second image sensor 420 may be aligned horizontally (e.g., again ensuring that the orientation of the objects within the scene 402 may be the same or approximately the same for an image captured by the first image sensor 410 as for an image captured by the second image sensor 420).

In some embodiments, the first image sensor 410 and/or the second image sensor 420 may each have one or more lenses through which light from the scene 402 enters the respective image sensor. Such lenses may be adjusted to modify the magnification of the scene 402 on a respective image sensor, modify the depth of field for a respective image sensor, and/or modify the focus of the image sensor (e.g., by adjusting a focal length of one or more of the one or more lenses). Additionally or alternatively, the first image sensor 410 and/or the second image sensor 420 may have one or more apertures through which light from the scene 402 enters the respective image sensor. Such apertures may be adjusted to control the amount of light from the scene 402 reaching a respective image sensor, modify the depth of field for a respective image sensor, and/or modify the range of viable exposure durations based on light reaching a respective image sensor for a given image being captured by a respective image sensor.

The first image sensor 410, in some embodiments, may be adjusted based on the composite luminance level of the scene 402 (fixed value based on the scene). For example, the first image sensor 410 may sense an illuminance value on the first image sensor 410, and transmit the illuminance value to a controller of the first image sensor 410. Based on the illuminance value, the controller may modify exposure settings corresponding to the first image sensor 410 (e.g., exposure duration/shutter speed, aperture size, focal length of one or more lenses, ISO sensitivity of the image sensor, etc.) until the illuminance value on the first image sensor 410 (modifiable value based on exposure settings) is within a threshold acceptable range. In this way, the first image sensor 410 may have a variable exposure that is adjusted by a controller based on illuminance value. This may be analogous to an "automatic exposure" setting in some cameras (e.g., a digital single-lens reflex (DSLR) camera).

In some embodiments, the second image sensor 420 may also modify exposure settings corresponding to the second image sensor 420 until the illuminance value on the second image sensor 420 is within a threshold acceptable range. In alternative embodiments, however, the second image sensor 420 may have fixed exposure settings. Because the second image sensor 420 receives light from the scene 402 via the neutral-density filter 422, if the second image sensor 420 is not adjusted based on illuminance value, the second image sensor 420 may capture images of the scene 402 at a lower overall intensity. Capturing images via the neutral-density filter 422 without compensating for the neutral-density filter 422 by modifying exposure settings (e.g., exposure duration, aperture size, etc.) can allow bright objects (e.g., an actively illuminated object like an emergency signal on an ambulance) to be observed without being overexposed. Additionally, capturing images at a lower overall intensity may reduce stray light, glare, and flare artifacts within the captured images.

In part because the second image sensor 420 includes a neutral-density filter 422 and the first image sensor 410 does not, and the second image sensor 420 might not compensate exposure settings when a lower illuminance value is present whereas the first image sensor 410 may, the first image sensor 410 and the second image sensor 420 may each have a corresponding (possibly different) dynamic range. As illustrated in FIG. 4B, a first dynamic range 414 may correspond to the first image sensor 410 and a second dynamic range 424 may correspond to the second image sensor 420.

Figure 4C:
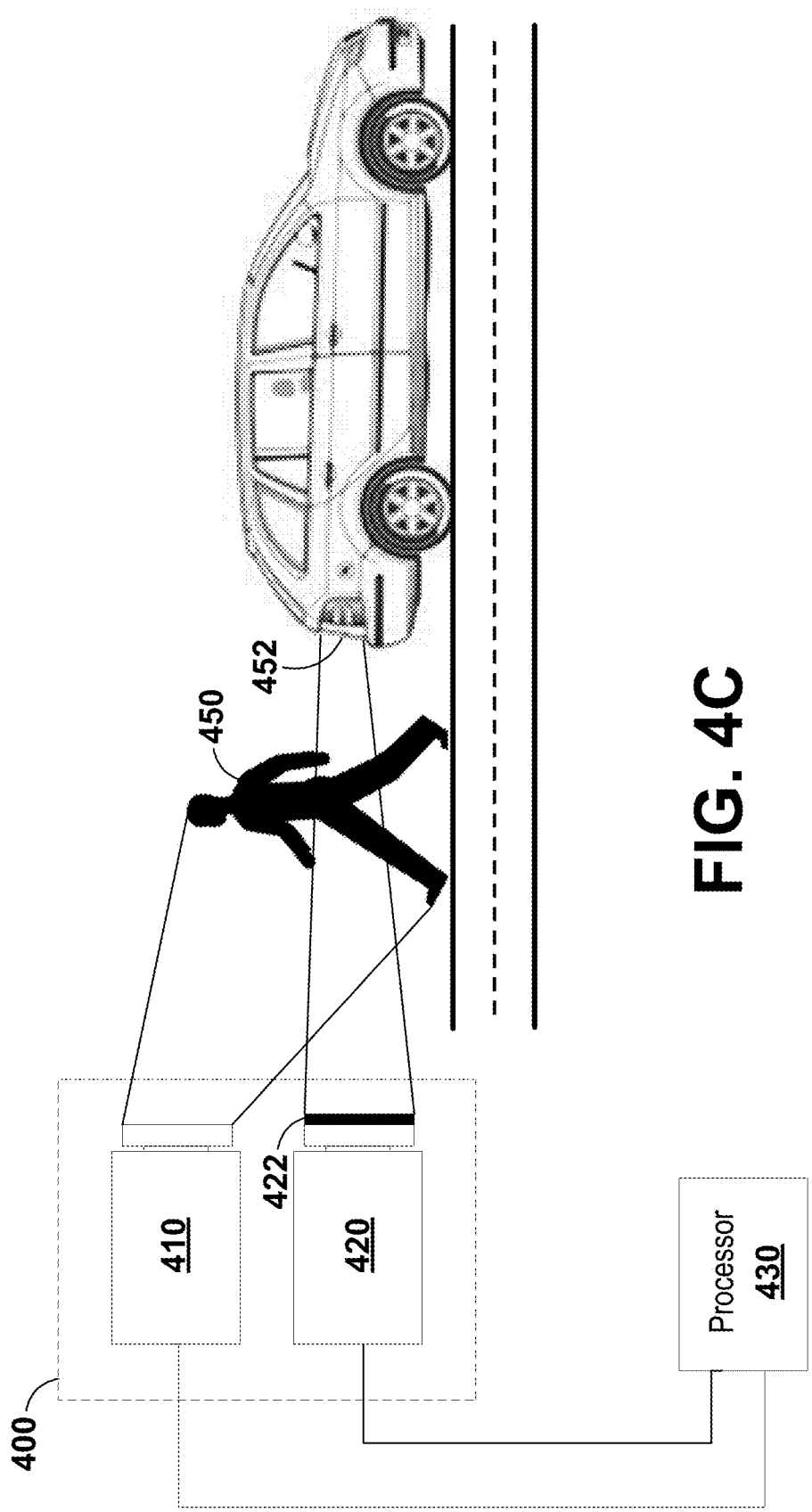
FIG. 4C is an illustration of a camera system, according to example embodiments.

Each of the dynamic ranges 414/424 may correspond to a range of luminance levels within the scene 402 (illustrated in FIG. 4B using a logarithmic scale for luminance). As illustrated in FIG. 4B, the second dynamic range 424 may correspond to a higher range of luminance levels than the first dynamic range 414. As such, the second image sensor 420 may be used to detect/identify objects having a higher luminance than the first image sensor 410. For example, an image captured by the second image sensor 420 may be used to identify a traffic light whereas an image captured by the first image sensor 410 may be used to identify a pedestrian. As an additional example, as illustrated in FIG. 4C, an image captured by the second image sensor 420 may be used to identify tail lights 452 (or other actively illuminated object) of a vehicle and an image captured by the first image sensor 410 may be used to identify a pedestrian 450 crossing the street (or other passively illuminated object). Such a pedestrian 450 may be crossing the street between the camera system 400 and the vehicle with the tail lights 452, for example.

Also as illustrated in FIG. 4B (by the arrows extending from the first dynamic range 414), because the first image sensor 410 may adjust its exposure settings based on illuminance values sensed by the first image sensor 410, the corresponding first dynamic range 414 may be varied to encompass higher or lower luminance values. Further, the second dynamic range 424 may include one or more luminance levels that are higher than the first dynamic range 414. As illustrated, at least a portion of the luminance levels of the first dynamic range 414 may overlap a portion of the luminance levels of the second dynamic range 424.

In alternate embodiments, the first dynamic range 414 may not overlap the second dynamic range 424 (e.g., every luminance level in the first dynamic range 414 may be lower than every luminance level in the second dynamic range 424). For example, there may be a range of luminance levels between the first dynamic range 414 and the second dynamic range 424 that is not covered by either the first dynamic range 414 or the second dynamic range 424. In still other embodiments, a portion or the entirety of the first dynamic range 414 may include luminance levels that are higher than all of the luminance levels in the second dynamic range 424.

In some alternative high-dynamic-range (HDR) imaging approaches, a continuum of luminance levels is used to generate a complete, composite image (e.g., HDR imaging approaches that use a single image sensor). However, some alternative HDR imaging approaches do not allow for a gap in the dynamic range. Thus, in embodiments where there is a range of luminance levels that contain objects that do not need to be observed/detected, those luminance levels can be skipped over. This can save on data storage and computation time, for example, when compared to HDR imaging approaches that do not allow for a gap in the dynamic range. Alternatively, in some embodiments disclosed herein, the first dynamic range 414 may entirely encompass the second dynamic range 424 or vice versa.

As illustrated in FIG. 4B, the collective dynamic range spanned by the camera system 400 (including the first dynamic range 414 and the second dynamic range 424) is larger than either of the first dynamic range 414 or the second dynamic range 424, individually.

Using a technique such as described above can effectively expand the dynamic range of a camera without necessarily modifying the image sensors themselves. Because the image sensors do not necessarily need to be modified, such a technique can lead to improved dynamic range without the need for specialized (and potentially expensive) cameras/image sensors.

Additionally, each of the first image sensor 410 and the second image sensor 420 may be connected to a processor 430 (e.g., analogous to the processor 113 illustrated in FIG. 1). The processor 430 may be a part of a computing device (e.g., the computer system 112 illustrated in FIG. 1) that executes instructions (e.g., the instructions 115 illustrated in FIG. 1) stored on a memory (e.g., the data storage 114 illustrated in FIG. 1). The processor 430 may receive a first captured image from the first image sensor 410 and/or a second captured image from the second sensor 420. Then, the processor 430 may attempt to identify or localize objects within either or both of the images (e.g., using an object-recognition/object-identification algorithm and/or a localization algorithm stored within the instructions). Using the identity and location of identified objects (e.g., location relative to one another and/or location relative to the vehicle), the processor 430 and/or an associated control system (e.g., the control system 106 illustrated in FIG. 1) may direct the behavior of various components of the vehicle (e.g., may alter the course of the vehicle using the steering unit 132, may alter the speed of the vehicle using the throttle 134, may turn on a turn signal, etc.).

In order to save computation time, the processor 430 may only attempt to identify actively illuminated objects (e.g., tail lights, traffic lights, etc.) using images captured by the second image sensor 420 and may only attempt to identify passively illuminated objects (e.g., objects illuminated by reflecting or refracting light, such as pedestrians, trees, stop signs, etc.) using images captured by the first image sensor 410.

Additionally or alternatively, in order to save computation time, the processor 430 may only attempt to identify objects at motion relative to the camera system 400 that have a high velocity relative to the shutter speed/exposure duration of the first image sensor 410 within an image captured by the first image sensor 410 (e.g., weather effects, such as rain). Still further, in order to save computation time, the processor 430 may only attempt to identify actively illuminated objects that are modulated at faster rates than the shutter speed/exposure duration of the first image sensor 410 within an image captured by the first image sensor 410 (e.g., construction signs).

Likewise, in order to save computation time, the processor 430 may only attempt to identify objects at motion relative to the camera system that have a low velocity or comparable velocity relative to the shutter speed/exposure duration of the first image sensor 410 within an image captured by the second image sensor 420 (e.g., pedestrians). Still further, in order to save computation time, the processor 430 may only attempt to identify actively illuminated objects that are modulated at similar or slower rates than the shutter speed/exposure duration of the first image sensor 410 within an image captured by the second image sensor 420 (e.g., flashing turn signals).

Further, in some embodiments, because the first image sensor 410 and the second image sensor 420 may each be configured to capture objects of specific types (e.g., fast-moving vs. slow-moving objects or actively illuminated vs. passively illuminated objects), the hardware of a given image sensor may be specialized for a given range of luminance levels and/or variations over time. For example, the second image sensor 420 may have hardware specialized for detecting passively illuminated objects (e.g., specialized hardware in addition to the neutral-density filter 422, such as different lenses than the first image sensor 410, one or more additional filters compared to the first image sensor 410, etc.).

Before transmitting captured images of the scene 402 to the computing device, the first image sensor 410 and the second image sensor 420 may compress the captured images. Additionally or alternatively, the computing device may compress the captured images after receiving them from the first image sensor 410 and the second image sensor 420.

Further, some object-identification algorithms (e.g., instructions stored within a memory executable by a processor to identify objects within an image) could be applied to images captured by the first image sensor 410 and the second image sensor 420. The object-identification algorithms may be optimized for HDR, 24-bit images (i.e., HDR images that represent each pixel by an 8-bit number for each of the following colors: red, green, and blue). Thus, if images captured by the first image sensor 410 and the second image sensor 420 are each 24-bit images, images captured by the first image sensor 410 and the second image sensor 420 may be combined into a single HDR, 24-bit image such that the combined image may be processed by one of the object-identification algorithms optimized for HDR, 24-bit images. In other embodiments, the object-identification algorithm may instead be optimized for other types of images (e.g., 30-bit images, 36-bit images, 42-bit images, 48-bit images, etc.).

Combining the two captured images into a single HDR, 24-bit image may include performing tone mapping (i.e., remapping the color sets in each of the individual captured images to a new global color set in the combined image in order to approximate HDR). While this can allow for the use of an expanded library of object-identification algorithms (e.g., object-identification algorithms that are optimized for HDR, 24-bit images), the tone mapping may sacrifice inherent data about physical luminance levels and global contrast contained across the individual images captured by the first image sensor 410 and the second image sensor 420.

In some embodiments, in order to preserve this inherent data about physical luminance levels and global contrast, each of the individual images may be fed into separate object-identification algorithms (e.g., executable by a processor and stored within a memory). Such separate object-identification algorithms may themselves be jointly and/or individually optimized for a given dynamic range (e.g., given range of luminance levels).

In still other embodiments, in order to preserve this inherent data about physical luminance levels and global contrast, each of the individual images may be fed into a single, combined object-identification algorithm that is designed to handle both images jointly. For example, the combined object-identification algorithm may be a machine-learned algorithm, such as a convolutional neural network. The convolutional neural network may treat the combined images as if they have six colors, as opposed to the canonical three colors (red, green, blue). The convolutional neural network may interpret the six color channels using an intermediate neuron layer that tracks more than three color values (e.g., six color values) per pixel, for example.

Figure 4D:
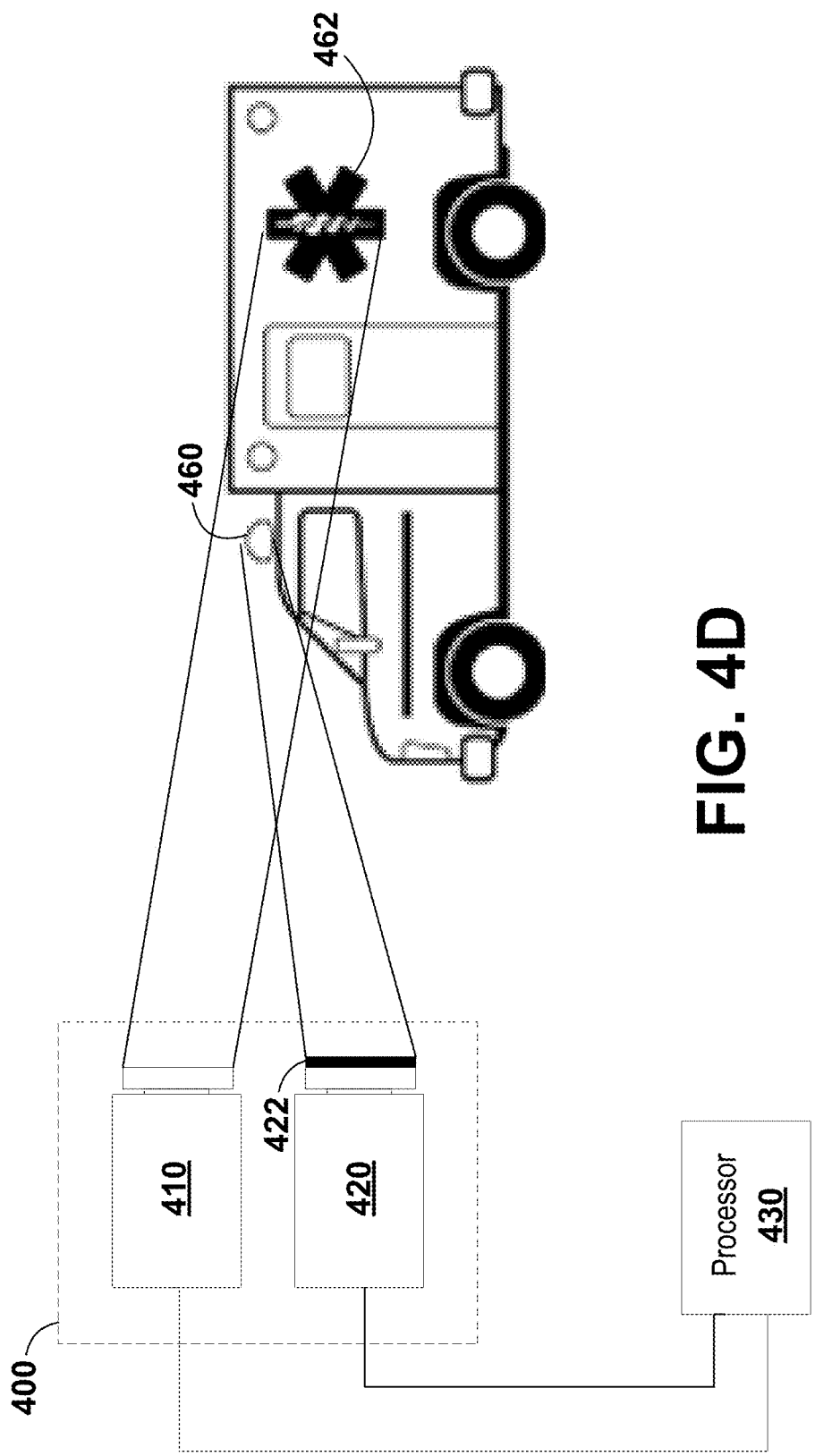
FIG. 4D is an illustration of a camera system, according to example embodiments.

Using such a combined object-identification algorithm, or other algorithms described herein, a processor may perform object identification of an object using both captured images, as opposed to using only a single captured image. For example, an emergency vehicle at night may include both high luminance levels (e.g., the emergency lights of the emergency vehicle) and low luminance levels (e.g., the tires or the painted body of the emergency vehicle). Thus, portions of both the image captured by the first image sensor 410 and the image captured by the second image sensor 420 may be used to identify the object as an ambulance, fire truck, or a police vehicle. Such an embodiment is illustrated in FIG. 4D. As illustrated, the second image sensor 420 may be directed toward lights 460 of an emergency vehicle (e.g., an ambulance) and the first image sensor 410 may be directed toward the painted body 462 of the emergency vehicle (e.g., red stripes on an emergency vehicle, a red checkered pattern on an emergency vehicle, or a red cross on an emergency vehicle). Using images captured by both image sensors, the emergency vehicle can be identified. For example, an identified combination of body paint that includes a red cross in a first image and red and white emergency lights in a second image may indicate that the identified object is an emergency vehicle (e.g., an ambulance). Further, based on whether the red and white emergency lights are flashing for example, it may be determined whether the emergency vehicle is en route to/from an active emergency.

As illustrated in FIG. 4A, the first image sensor 410 and the second image sensor 420 may be offset with respect to one another by a distance (e.g., vertically offset by a distance in FIG. 4A). For example, the first image sensor 410 may be above, below, to the left, to the right, in front, behind, or some superposition of above, below, to the left, to the right, in front, and behind of the second image sensor 420 with respect to the scene 402. Because of the offset distance, a processor connected to the camera system 400 may be configured to perform binocular distance calculations, regardless of whether an object can be properly identified in an image captured by the first image sensor 410 or in an image captured by the second image sensor 420. The distance may be determined by a processor executing instructions in order to calculate the parallax between the location of an object within an image captured by the first image sensor 410 and the location of an object within an image captured by the second image sensor 420 (taking into account a known offset distance between the first image sensor 410 and the second image sensor 420).

A more conventional method of capturing two images, with separate dynamic ranges, of the same scene includes using a camera with only a single image sensor (rather than two image sensors). Using a camera with a single image sensor, an image may be captured of a scene at a first dynamic range (e.g., depending on exposure settings such as ISO, sensor sensitivity, exposure duration/shutter speed, aperture size, etc.). Then, the exposure settings of the single image sensor may be changed (e.g., by modifying the shutter speed/exposure duration or aperture size), and a second image of the scene at a second dynamic range may be captured.

However, because multiple images are being captured by the same image sensor, with a modification of exposure settings in between capture events, the two images may not be captured substantially simultaneously. Thus, if later the two images are to be compared with one another (e.g., for redundancy in object recognition and/or error checking), the perspective of the scene may have substantially changed between capturing both of the images. While this may be acceptable for stationary scenes (e.g., portraits), this can create issues for moving scenes. For example, if the single image sensor is mounted on a moving vehicle, even if only 50 ms is required to modify the exposure settings between image capture events, the perspective may be substantially different between image capture events (e.g., if the moving vehicle is moving at 50 mph, 50 ms corresponds to a translation of 1.1 m, which may be non-negligible).

Further, because the images of a scene are not captured substantially simultaneously by a single image sensor that is modifying exposure settings between image capturing events, the images of the scene also might not be transmitted to a computing device performing object analysis substantially simultaneously. This can be problematic if the camera of the single image sensor only has enough onboard memory to locally store one captured image at a time. The processor of the computing device could process each of the captured images sequentially, or the camera could reduce the resolution of the captured image so that it can store two images within its local memory and then transmit both images to the computing device. However, this also may give rise to a problem, because a significant lag between when the first image is captured, and when the computing device is performing image analysis on the first image may be present. Thus, by the time the computing device is processing the first image captured, it may be too late to make meaningful control decisions based on the captured first image.

The potential issues described in the three preceding paragraphs can be alleviated or eliminated entirely through the use of camera systems described herein.

FIG. 5 illustrates a camera system 500, according to example embodiments. As illustrated, the camera system 500 may include an image sensor 510, a neutral-density filter 522, a first lens 514, and a second lens 524. The first lens 514 may direct a field of view of the scene 402 to a first independent region of the image sensor 510. Similarly, the second lens 524 may direct a field of view of the scene 402 to a second independent region of the image sensor 510. The second lens 524, as illustrated, may direct a field of view of the scene 402 to the second independent region of the image sensor through the neutral-density filter 522. In other embodiments, other optical components (e.g., free-space optics other than lenses) may be used in addition to or alternative to the first lens 514 and the second lens 524 in order to direct a field of view of the scene 402 to independent sensor regions of the first image sensor 510. In some embodiments, the camera system 500 may also include a processor (e.g., analogous to the processor 430 illustrated in FIG. 4A) that is communicatively coupled to the image sensor 510 and configured to perform object recognition (e.g., by executing instructions stored within a memory).

In some embodiments, the image sensor 510 may have a variable exposure across both independent sensor regions. The variable exposure may be controlled by a controller by adjusting various exposure settings (e.g., exposure duration, ISO sensitivity, etc.) based on a composite illuminance sensed by both independent sensor regions (e.g., based on an average of the illuminance of the first sensor region and the illuminance of the second sensor region). In other embodiments, the exposure settings across both independent sensor regions may be fixed. In still other embodiments, the exposure settings of both independent sensor regions may be individually controllable. For example, the upper independent sensor region may have its sensitivity adjusted by a controller based on the illuminance sensed on the upper independent sensor region, whereas the lower independent sensor region may have fixed exposure settings regardless of illuminance sensed on the lower independent sensor region.

Using the camera system 500 of FIG. 5, a single image sensor can be used to capture a composite image. The composite image may include multiple regions, each region containing an entire reproduction of the scene 402 with a given field of view and perspective. In some embodiments, the field of view and perspective may be the same for each region. Even so, each of the regions of the composite image may be captured with different illuminance. In this way, different regions of the captured image may be analyzed to identify objects within different dynamic ranges. Taking the example of FIG. 5, the upper region of a corresponding captured composite image may be used to identify objects (e.g., by a processor executing an object-identification algorithm) having lower relative luminance values (e.g., passively illuminated objects), whereas the lower region of a corresponding captured composite image may be used to identify objects (e.g., by a processor executing an object identification algorithm) having higher relative luminance values (e.g., actively illuminated objects).

In alternate embodiments, the independent sensor regions may be arranged on left and right, rather than top and bottom. In still other embodiments, there may be more than two independent sensor regions. For example, in one embodiment, there may be four independent sensor regions: one independent sensor region without a neutral-density filter, one independent sensor region covered by one neutral-density filter (e.g., an ND8 neutral-density filter), one independent sensor region covered by another neutral-density filter (e.g. an ND128 neutral-density filter), and one independent sensor region covered by yet another neutral-density filter (e.g., an ND4096 neutral-density filter).

Figure 6A:
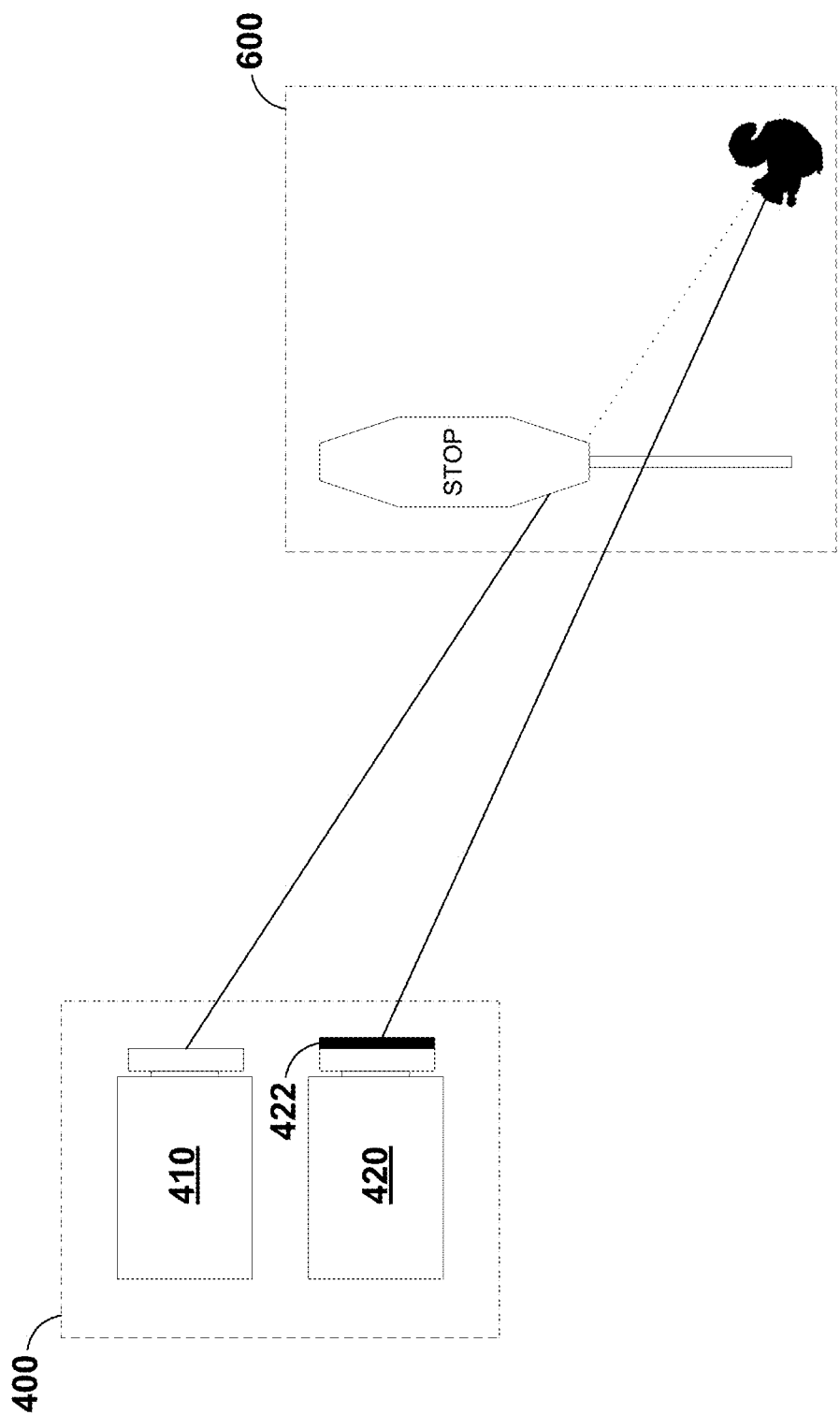
FIG. 6A is an illustration of a camera system, according to example embodiments.

FIG. 6A is an illustration of a camera system 400, according to example embodiments. The camera system 400 may be the same camera system 400 illustrated in FIG. 4A, for example. In FIG. 6A, the camera system 400 is being used to capture images of a scene 600. As with the camera system 400 illustrated in FIG. 4A, the first image sensor 410 and the second image sensor 420 may be vertically offset from one another by some distance. As such, the perspective of the first image sensor 410 relative to the scene 600 may be different than the perspective of the second image sensor 420 relative to the scene 600. In some embodiments, the camera system 400 may also include a processor (e.g., analogous to the processor 430 illustrated in FIG. 4A) that is communicatively coupled to the first image sensor 410 and the second image sensor 420 and configured to perform object recognition (e.g., by executing instructions stored within a memory).

Figure 6B:
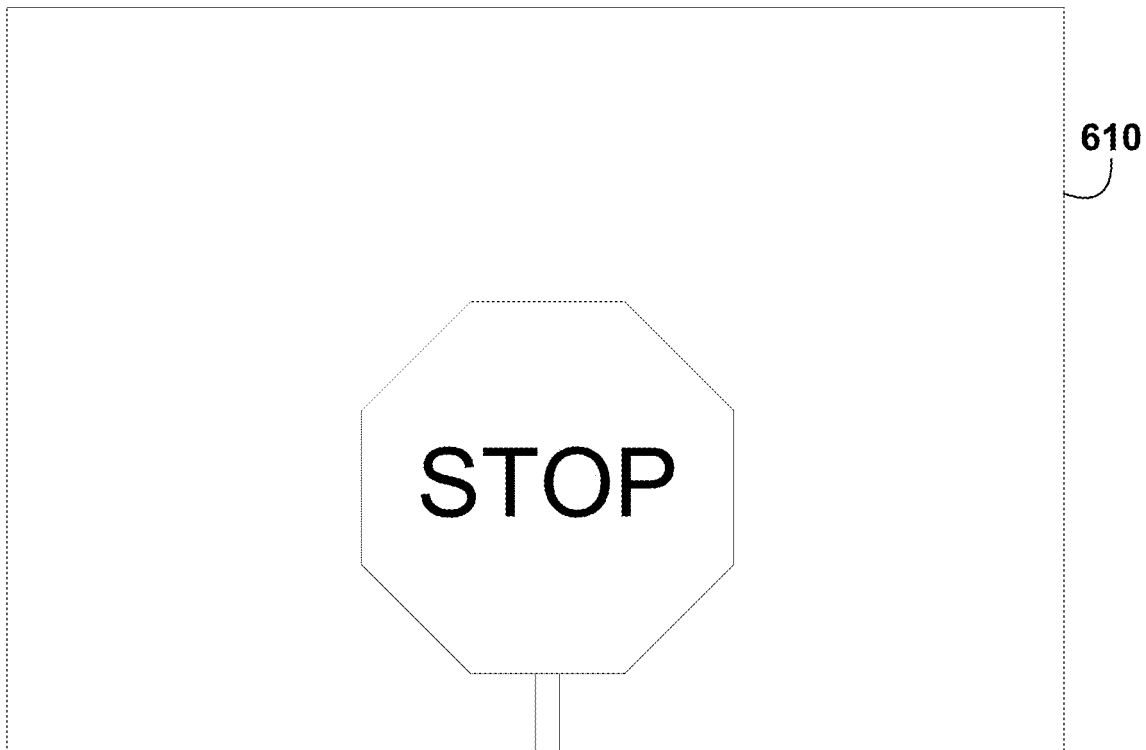
FIG. 6B is an illustration of an image captured by an image sensor of a camera system, according to example embodiments.
Figure 6C:
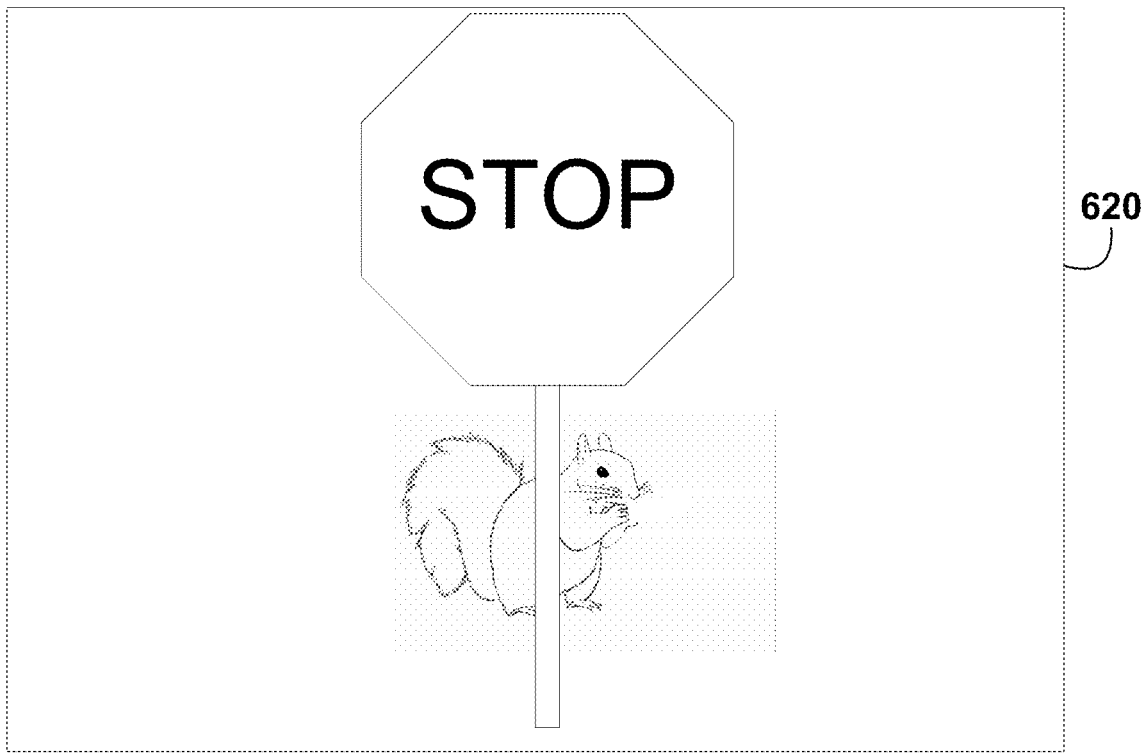
FIG. 6C is an illustration of an image captured by an image sensor of a camera system, according to example embodiments.

Because the image sensors are at different perspectives relative to the scene 600, images captured by the respective image sensors may appear differently. For example, a first image 610 of the scene 600 captured by the first image sensor 410 is illustrated in FIG. 6B. Similarly, a second image 620 of the scene 600 captured by the second image sensor 420 is illustrated in FIG. 6C. As illustrated by the dotted line in FIG. 6A, as well as the difference between the first image 610 and the second image 620 of FIGS. 6B and 6C, respectively, some objects in the scene 600 may not be observable from all perspectives. For example, the squirrel in the scene 600 is not observable by the first image sensor 410, but is observable by the second image sensor 420.

Further, if an object in the scene 600 has a luminance value that is within both the first dynamic range 414 and the second dynamic range 424, images captured by both image sensors can be used to identify the object (e.g., by an object identification algorithm executed by a processor), if the object is present within a respective perspective of the scene 600 for a respective image sensor 410/420.

Because the object is identifiable within images recorded by the first image sensor 410 and the second image sensor 420, the object identification may include error correction and redundancy. For example, two image sensors each at a different perspective relative to a scene can be used to correct for stray light and scatter due to artifacts within the scene. If a bright object, such as the sun, is directly behind an object to be identified, that object might be blown out, overexposed, distorted, or saturated in one of the two images captured by the first image sensor 410 and the second image sensor 420, respectively, due to the presence of the sun. However, in the other of the two images, the sun may be positioned differently with respect to the object to be identified, thus obviating issues of blown out features, overexposure, distortion, and/or saturation issue. Hence, the image in which the sun is not positioned directly behind the object to be identified may be used (e.g., by a processor executing an object-identification algorithm stored within a memory) to identify the object. Additional or alternative types of stray light, scatter, and/or occlusion may be accounted for using image sensors at multiple perspectives (e.g., louvers from actively illuminated light sources).

Using the example of FIG. 6A, if the first image sensor 410 captures the first image 610, the processor may analyze the first image 610 and not identify a squirrel because the squirrel is not present in a field of view of the first image sensor 410. However, using the second image 620 captured by the second image sensor 420, the processor may identify a squirrel near the stop sign because the squirrel is present in a field of view of the second image sensor 420. Further, even though the squirrel was only identified in one of the images, a corresponding control system could still account for the presence of the squirrel in its respective location within the scene (e.g., by avoiding the squirrel using the steering unit 132).

Further, if a given object is in the perspective of both the first image sensor 410 and the second image sensor 420, unlike in FIG. 6A, and the object has luminance value within both the first dynamic range 414 and the second dynamic range 424, the object should be identifiable within images captured by both the first image sensor 410 and the second image sensor 420. However, if the object is only identified in one of the two images or identified to be a different object within the two images, a corresponding computing device performing object identification may rectify this in a variety of ways. For example, a voting system (e.g., based on confidence levels identified for a given object identification) may be implemented to determine whether the object was actually present in the scene or which of the two identified object possibilities is more likely to be accurate (if an object was identified to be a different object within the two images). Further, if an object is only identifiable in images captured by one of the sensors, the dynamic range of the sensor (e.g., the first dynamic range 414 or the second dynamic range 424) in which the object is identifiable could be used to identify a luminance range of the object.

If an object is unidentified or misidentified by a computing device, the computing device may output an alert that the image sensor corresponding to the image where the misidentification or lack of identification occurred is dysfunctional. Additionally or alternatively, the computing device and/or a corresponding control system may perform an action to attempt to correct the dysfunction (e.g., clean a lens by clearing debris with a wiper blade and/or applying cleaning fluid or apply a corrective calibration factor in the object identification algorithm).

In addition, redundancy and error correction may be based on differences within the captured images other than differences in identified objects. For example, the sharpness between an image captured by the first image sensor 410 and an image captured by the second image sensor 420 may be compared. If one of the captured images is less sharp, an occlusion in the optical path of the second image sensor 420 and/or a misalignment of the second image sensor 420 may be detected. Such an occlusion may include debris on the second image sensor 420 or an associated lens or a smudge on a lens of the second image sensor 420, for example. Other differences besides sharpness may also be compared in various embodiments. For example, contrast can also be compared. Additionally or alternatively, severe occlusion could also be identified (e.g., if 50% or more of one image sensor is occluded by debris).

In still other embodiments, error checking and/or error correction may be performed by comparing contents of entire images. In some embodiments, a gradient or a gradient sum computed across all pixels within an image can be compared between images. For example, if a traffic light (or other actively illuminated object) is present within images captured by the first image sensor 410 and the second image sensor 420, pixels corresponding to the traffic light may correspond to a sharp increase in brightness value relative to the pixels surrounding the traffic light. This sharp increase in brightness values may be present in both images, possibly irrespective of the raw brightness values of the pixels corresponding to the traffic light in both images. Hence, brightness gradient sums computed across both images can be compared to confirm that such a traffic light is in fact present in both images. Other statistics, besides brightness gradient sums, computed across entire images can also be compared for the purpose of error checking and/or error correction. For example, sharpness gradient sums, color gradient sums, hue gradient sums, etc. could be compared.

Figure 7:
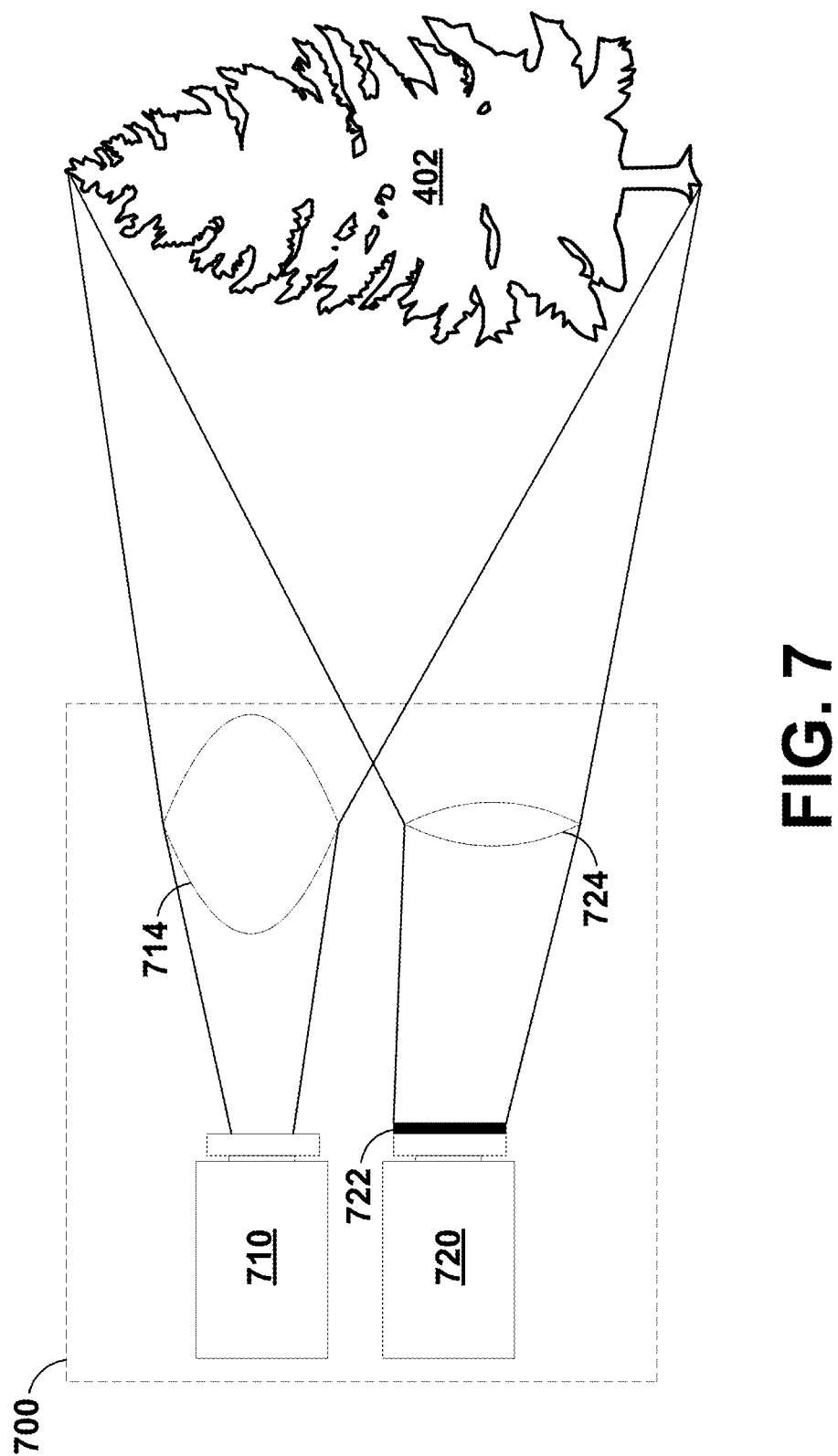
FIG. 7 is an illustration of a camera system, according to example embodiments.

FIG. 7 illustrates a camera system 700. In some embodiments, the camera system 700 may be mounted on an autonomous vehicle and used for object detection and avoidance, as well as navigation. The camera system 700 may be analogous to the camera system 400 illustrated in FIG. 4A. For example, the camera system 700 may include a first image sensor 710 and a second image sensor 720, and the second image sensor 720 may receive light from the scene 402 via a neutral-density filter 722 or similar mechanism. Unlike the camera system 400 of FIG. 4, however, the camera system 700 illustrated in FIG. 7 includes a first lens 714 and a second lens 724, somewhat analogous to the first lens 514 and the second lens 524 illustrated in FIG. 5. In alternate embodiments, the first image sensor 710 may also receive light from the scene 402 via a neutral-density filter. In still other embodiments, neither the first image sensor 710 nor the second image sensor 720 may receive light from the scene 402 via a neutral-density filter. In some embodiments, the camera system 700 may also include a processor (e.g., analogous to the processor 430 illustrated in FIG. 4A) that is communicatively coupled to the first image sensor 710 and the second image sensor 720 and configured to perform object recognition (e.g., by executing instructions stored within a memory).

Further, in various embodiments, the first image sensor 710 and/or the second image sensor 720 may have variable exposure settings (e.g., that are adjustable by a camera controller based on illuminance values sensed by the first image sensor 710 and/or the second image sensor 720). Additionally or alternatively, the first image sensor 710 and/or the second image sensor 720 may have fixed exposure settings.

The first lens 714 directs light from the scene 402 to the first image sensor 710, and the second lens 724 directs light from the scene 402 to the second image sensor 720. In alternate embodiments, there may be more than one lens/optical element directing light from the scene 402 to the image sensors. For example, one or more mirrors may be included within the camera system 700 to direct the light from the scene 402.

As illustrated, the first lens 714 and the second lens 724 may have different focal lengths. In some embodiments, the focal length of the first lens 714 may be greater than the focal length of the second lens 724. In other embodiments, the focal length of the first lens 714 may be less than the focal length of the second lens 724. In still other embodiments, the first lens 714 and the second lens 724 may have the same focal length.

In some embodiments, because the focal length and/or position of best focus of the first lens 714 and the second lens 724 are different, images captured by the first image sensor 710 may have a different zoom level than images captured by the second image sensor 720. Additionally or alternatively, because the focal length of the first lens 714 and the second lens 724 are different, an image of the scene 402 captured by the first image sensor 710 may have different objects in focus than an image of the scene 402 captured by the second image sensor 720. For example, if the first lens 714 has a smaller focal length than the second lens 724, an object in the foreground of the scene 402 may be in focus for images captured by the first image sensor 710 whereas objects in the background of the scene 402 may be in focus for images captured by the second image sensor 720. Which objects are in focus may be independent of focal lengths of the first lens 714/second lens 724, in some embodiments. Further, which objects are in focus may be adjustable by modifying other optical characteristics associated with the image sensors besides focal length.

Because images captured by the first image sensor 710 and images captured by the second image sensor 720 may have different objects in and out of focus, the combination of images simultaneously captured by each of the image sensors may be used to determine depth. For instance, assuming an object is within the dynamic range of both the first image sensor 710 and the second image sensor 720, the object can be identified within images captured by both the first image sensor 710 and the second image sensor 720 (e.g., using an object identification algorithm executed by a processor coupled to the camera system 700) if the object is properly in focus. However, if the identifiable object is in the foreground or the background of the scene 402, given the difference in focal lengths between the first lens 714 and the second lens 724, the object may only be properly in focus in an image captured by the first image sensor 710 or an image captured by the second image sensor 720 (not in images captured by both).

Based on the associated focal length of the lens for the image sensor that captured the image in which the object is identified, a distance between the identified object within the scene 402 and the camera system 700 may be determined or estimated. A determination of the distance between the object within the scene 402 and the camera system 700 may be based on the first focal length, the second focal length, a focus of the object within the first image of the scene 402, and/or a focus of the object within the second image of the scene 402. In alternate embodiments, rather than two image sensors each having a respective lens with a respective focal length, the camera system 700 may include an array of a plurality of image sensors, each having a respective lens that has a unique focal length with respect to the other lenses within the array.

In addition to determining a distance to an identified, in-focus object based on a focal length of an associated lens, distances to objects that are out of focus in both images may be calculated. For example, assuming an object is within the dynamic range of both the first image sensor 710 and the second image sensor 720, the object can be captured within images captured by both the first image sensor 710 and the second image sensor 720. Even though the object might not be identifiable in a given image (e.g., using an object-identification algorithm), a distance to the object might still be determinable in such images (e.g., using a localization algorithm).

A processor executing an object-recognition algorithm (e.g., a machine-learned object recognition algorithm) may be able, in addition to identifying objects that are in focus, to identify objects that are out of focus. For example, a processor executing an object recognition algorithm may be able to detect a stop sign within images of the scene 402 captured by both the first image sensor 710 and the second image sensor 720, even if the stop sign is not in focus for either of the captured images. Based on how out of focus the stop sign is in each of the captured images, the processor executing the object-recognition algorithm may be able to determine a distance from the camera system 700 to the stop sign. Alternatively, the processor could identify a difference in sharpness between the stop sign in each of the images, based on how out of focus the stop sign is in each of the captured images. This difference in sharpness could be used to determine a distance from the camera system 700 to the stop sign.

In addition to determining the distance from the camera system 700 to an object, a processor associated with the camera system 700 may execute instructions stored within a memory to generate a composite image based on an image captured by the first image sensor 710 and an image captured by the second image sensor 720. The composite image may be an image that has all objects within the scene, each object at a respective depth, in focus or approximately in focus. For example, the processor executing the instructions may extract regions from an image captured by the first image sensor 710 that correspond to objects in the foreground of the scene 402, because the first lens 714 has a shorter focal length than the second lens 724. Similarly, the processor executing the instructions may extract regions from an image captured by the second image sensor 720 that correspond to objects in the background of the scene 402, because the second lens 724 has a longer focal length than the first lens 714. The processor executing the instructions may then combine these regions into a single composite image that represents multiple focal lengths.

Additionally or alternatively, a processor associated with the camera system 700 may execute instructions stored within a memory to generate one or more images with simulated focal depths and/or simulated lenses with simulated focal lengths. For example, an image of the scene 402 captured by the first image sensor 710 of the scene 402 may correspond to a minimum focal length (e.g., based on the focal length of the first lens 714) and an image of the scene 402 captured by the second image sensor 720 may correspond to a maximum focal length (e.g., based on the focal length of the second lens 724). Using these two images to define the edges of a range of potential focal lengths, the processor executing the instructions may simulate (e.g., generate, store, and/or transmit) images having intermediate focal lengths between the minimum focal length and the maximum focal length. Alternatively, using these two images, the processor executing the instructions may simulate (e.g., generate, store, and/or transmit) images having various focal depths. This may be done by sharpening certain regions of either of the images, blurring certain regions of either of the images, and/or compositing the original, the sharpened, or the blurred regions of either of the images.

In some embodiments, rather than using separate lenses (e.g., a first lens 714 and a second lens 724), a single, astigmatic lens may be used to provide light from the scene 402 to both the first image sensor 710 and the second image sensor 720. Because the first image sensor 710 and the second image sensor 720 may be offset from one another by a distance, the astigmatic lens could provide light from the scene to each of the image sensors at different focal lengths. In an alternative embodiment, each image sensor, individually, could have a respective astigmatic lens (e.g., a first astigmatic lens for the first image sensor 710 and a second astigmatic lens for the second image sensor 720). In this way, an image captured by the first image sensor 710 and/or an image captured by the second image sensor 720 could, itself, contain various regions of the scene 402 captured at different focal lengths. The astigmatic lenses could also be translated or rotated with respect to the respective image sensors, resulting in additional focal lengths captured by the respective image sensor.

In addition to or alternative to having lenses of different focal lengths, in some embodiments, the first image sensor 710 and the second image sensor 720 may each have associated apertures of differing sizes. Such apertures may be adjustable in size (e.g., by a controller), in some embodiments. In other embodiments, such apertures may be fixed in size. By using apertures of different sizes, each of the image sensors may capture a different depth of field. Differing depths of field may be used (e.g., by a processor coupled to the camera system 700 executing instructions stored within a memory) to determine distances of an object relative to the camera system 700 and/or to simulate images of the scene 402 with a variety of depths of field and/or focal lengths.

Further, in addition to or alternative to lenses and apertures, other optical elements may disposed in front of the first image sensor 710 and/or the second image sensor 720. The other optical elements could be used to evaluate/study other features of the scene 402 (e.g., color using chromatic filters or polarization using polarizing filters).

FIG. 8A illustrates a camera system 800. In some embodiments, the camera system 800 may be mounted on an autonomous vehicle and used for object detection and avoidance, as well as navigation. The camera system 800 may include a first image sensor 810 and a second image sensor 820 that receives light from the scene 402 via a neutral-density filter 822, analogous to the camera system 400 illustrated in FIG. 4A. Unlike the camera system 400 of FIG. 4, however, the camera system 800 illustrated in FIG. 8A may also include a third image sensor 830. In alternate embodiments, the first image sensor 810 and/or the third image sensor 830 may also receive light from the scene 402 via a neutral-density filter. In still other embodiments, none of the first image sensor 810, the second image sensor 820, or the third image sensor 830 may receive light from the scene 402 via a neutral-density filter. Other combinations of image sensors with neutral-density filters are also possible. In some embodiments, the camera system 800 may also include a processor (e.g., analogous to the processor 430 illustrated in FIG. 4A) that is communicatively coupled to the first image sensor 810, the second image sensor 820, and the third image sensor 830 and configured to perform object recognition (e.g., by executing instructions stored within a memory).

Similar to the first image sensor 410 described above with respect to FIG. 4A, in some embodiments, the first image sensor 810 may be adjusted based on the composite luminance level of the scene 402. For example, the first image sensor 810 may sense an illuminance value on the first image sensor 810, and transmit the illuminance value to a controller of the first image sensor 810. Based on the illuminance value, the controller may modify exposure settings corresponding to the first image sensor 810 (e.g., exposure duration/shutter speed, aperture size, focal length of one or more lenses, ISO sensitivity of the image sensor, etc.) until the illuminance value on the first image sensor 810 is within a threshold acceptable range. In this way, the first image sensor 810 may have a variable exposure that is adjusted by a controller based on illuminance value. This may be analogous to an "automatic exposure" setting in some cameras (e.g., a DSLR camera).

Additionally or alternatively, the third image sensor 830 may be adjustable based on the composite luminance level of the scene 402, in some embodiments. For example, the third image sensor 830 may sense an illuminance value on the third image sensor 830, and transmit the illuminance value to a controller of the third image sensor 830. The controller of the third image sensor 830 may be the same controller as the controller of the first image sensor 810 or a different controller, in various embodiments. Regardless, the third image sensor 830 may be controlled independently of the first image sensor 810. Based on the illuminance value on the third image sensor 830, the controller of the third image sensor 830 may modify exposure settings corresponding to the third image sensor 830 (e.g., exposure duration/shutter speed, aperture size, focal length of one or more lenses, ISO sensitivity of the image sensor, etc.) until the illuminance value on the third image sensor 830 is within a threshold acceptable range for illuminance.

The threshold acceptable range for illuminance for the third image sensor 830 may be different than the threshold acceptable range for illuminance for the first image sensor 810, in some embodiments. For example, the threshold acceptable range for illuminance on the third image sensor 830 may include a plurality of illuminance values that are lower than any illuminance values within the threshold acceptable range for illuminance on the first image sensor 810. In such an embodiment, the exposure level of the third image sensor 830 may be higher than the exposure level of the first image sensor 810, thereby making the third image sensor 830 more sensitive to low luminance objects in the scene 402 than the first image sensor 810.

Similar to the second image sensor 420 illustrated in FIG. 4A and described above, the second image sensor 820 may have fixed exposure settings (e.g., based on exposure duration/shutter speed, aperture size, focal length of one or more lenses, ISO sensitivity of the image sensor, etc.). In alternate embodiments, the first image sensor 810 and/or the third image sensor 830 may also have fixed exposure settings (rather than variable exposure settings). Additionally or alternatively, in some embodiments, the second image sensor 820 may instead have variable exposure settings (e.g., controlled by a controller of the second image sensor 820).

Figure 8B:
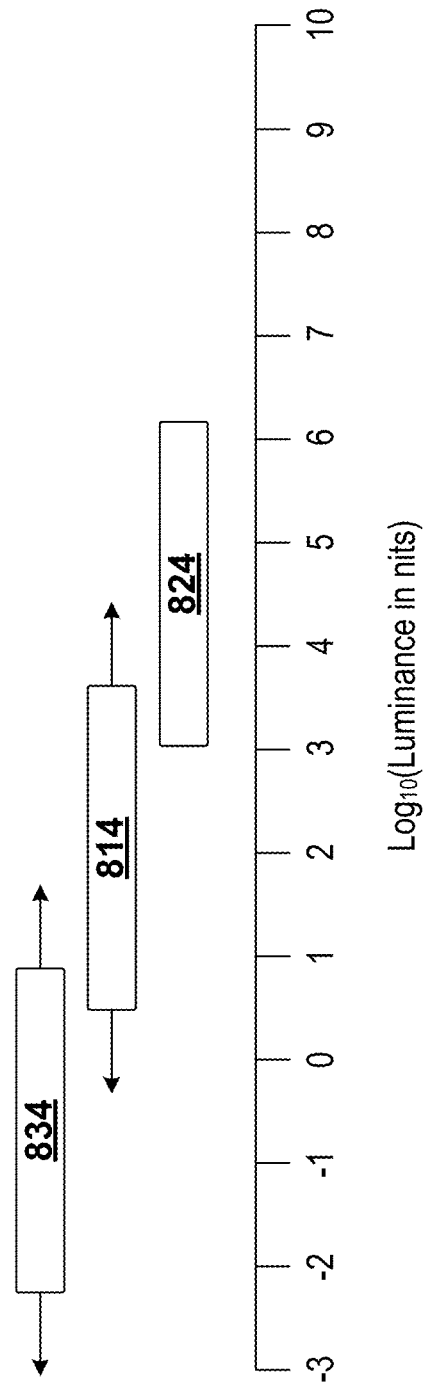
FIG. 8B is an illustration of the dynamic range of a camera system, according to example embodiments.

As illustrated in FIG. 8B, a first dynamic range 814 may corresponding to the first image sensor 810, a second dynamic range 824 may correspond to the second image sensor 820, and a third dynamic range 834 may correspond to the third image sensor 830. Also as illustrated, the collective dynamic range spanned by a system including the first dynamic range 814, the second dynamic range 824, and the third dynamic range 834 may be larger than any of the dynamic ranges individually.

Each of the dynamic ranges 814/824/834 may correspond to a range of luminance levels within the scene (illustrated in FIG. 8B using a logarithmic scale for luminance). As illustrated in FIG. 8B, the second dynamic range 824 may correspond to a higher range of luminance levels than the first dynamic range 814 and the third dynamic range 834. As such, the second image sensor 820 may be used to detect/identify objects having a higher luminance than the first image sensor 810 and the third image sensor 830. For example, an image captured by the second image sensor 820 may be used to identify a street light (an actively illuminated object) whereas an image captured by the first image sensor 810 may be used to identify a pedestrian (a passively illuminated object).

Similarly, as illustrated, the third dynamic range 834 may correspond to a lower range of luminance levels than the first dynamic range 814 and the second dynamic range 824. As such, the third image sensor 830 may be used to detect/identify objects having a lower luminance than the first image sensor 810 and/or the second image sensor 820. For example, if an image captured by the second image sensor 820 is used to identify a street light, and an image captured by the first image sensor 810 is used to identify a pedestrian, an image captured by the third image sensor 834 may be used to identify a black cat in a shadow of a building (a passively illuminated object). In some embodiments, a portion of the third dynamic range 834 may overlap or encompass the entirety of the first dynamic range 814. Additionally or alternatively, a portion of the third dynamic range 834 may overlap or encompass the entirety of the second dynamic range 824.

As illustrated by the arrows extending from the first dynamic range 814, because the first image sensor 810 may adjust its exposure settings based on illuminance sensed by the first image sensor 810, the corresponding first dynamic range 814 may be varied to span higher or lower luminance values. Analogously, again illustrated by the arrows extending from the third dynamic range 834, because the third image sensor 830 may adjust its exposure settings based on illuminance sensed by the third image sensor 830, the corresponding third dynamic range 834 may be varied to span higher or lower luminance values. In alternate embodiments, the second image sensor 820 may also adjust its exposure settings based on illuminance sensor by the second image sensor 820. In such embodiments, the corresponding second dynamic range 824 may be varied to span higher or lower luminance values.

FIG. 9A illustrates a camera system 900, according to example embodiments. As illustrated, the camera system 900 may be disposed adjacent to (e.g., above) or be a part of a sensor unit 202 of a vehicle 200 (as illustrated in FIG. 2). The camera system 900 may include a plurality of camera sub-systems (e.g., each camera sub-system being analogous to the camera system 400 illustrated in FIG. 4A). For example, the camera system 900 may include a first camera sub-system 400A that faces forward and a second camera sub-system 400B that faces backward, relative to the forward direction of travel of the vehicle 200. The forward-facing camera sub-system 400A may receive light from a first perspective 902 of a scene and the backward-facing camera sub-system 400B may receive light from a second perspective 904 of the same scene. In some embodiments, the camera system 900 may also include a processor (e.g., analogous to the processor 430 illustrated in FIG. 4A) that is communicatively coupled to the image sensors in the first camera sub-system 400A and/or the second camera sub-system 400B and configured to perform object recognition (e.g., by executing instructions stored within a memory).

In some embodiments, the first perspective 902 and the second perspective 904 may include different objects than one another (e.g., the first perspective 902 may contain a tree while the second perspective 904 contains a stop sign). Additionally or alternatively, the first perspective 902 may contain actively illuminated objects and/or passively illuminated objects. Similarly, the second perspective 904 may contain actively illuminated objects and/or passively illuminated objects. Using the camera system 900, objects in multiple directions relative to the vehicle 200 (i.e., multiple perspectives based on the field of view of each of the image sensors of the camera system 900) may be captured and identified.

Each of the plurality of camera sub-systems 400A/400B may include a first image sensor 410A/410B and a second image sensor 420A/420B. Similar to the first image sensor 410 and the second image sensor 420 illustrated in FIG. 4A, the first image sensor 410A/410B in each of the camera sub-systems 400A/400B may have variable exposure settings controlled by a controller and the second image sensor 420A/420B in each of the camera sub-systems 400A/400B may receive light via a neutral-density filter 422A/422B and have fixed exposure settings. Also, similar to the first image sensor 410 and the second image sensor 420 illustrated in FIG. 4A, the first image sensor 410A/410B and the second image sensor 420A/420B in each of the camera sub-systems 400A/400B may be aligned vertically with one another. In alternate embodiments, the first image sensor 410A/410B and the second image sensor 420A/420B may be aligned differently and/or at different distances with respect to one another across the plurality of camera sub-systems 400A/400B within the camera system 900.

Images captured by each image sensor 410A/410B/420A/420B from each of the camera sub-systems 400A/400B may be transmitted to a single computing device (e.g., including a processor configured to execute instructions stored within a memory to perform object identification). Alternatively, images captured by each image sensor 410A/410B/420A/420B from respective camera sub-systems 400A/400B may be transmitted to independent, respective computing devices.

Regardless of whether a single computing device or a plurality of computing devices is performing object recognition/identification, the computing device(s) may attempt to save computation time (e.g., based on object-recognition instructions executed by a processor and stored within a memory) by only searching for objects of a first type in images captured by the first image sensors 410A/410B and only searching for objects of a second type in images captured by the second image sensors 420A/420B. The first type of objects may include actively illuminated objects having a slow or comparable modulation time when compared with shutter speeds/exposure durations of the first image sensors 410A/410B and the second image sensors 420A/420B, passively illuminated objects, objects moving at high velocities relative to the shutter speeds/exposure durations of the first image sensors 410A/410B and the second image sensors 420A/420B, or objects having a low luminance when compared to the rest of the scene. The second type of objects may include actively illuminated objects having a fast modulation time when compared with shutter speeds/exposure durations of the first image sensors 410A/410B and the second image sensors 420A/420B, objects moving at slow or comparable velocities relative to the shutter speeds/exposure durations of the first image sensors 410A/410B and the second image sensors 420A/420B, or objects having a high luminance when compared to the rest of the scene.

Figure 9B:
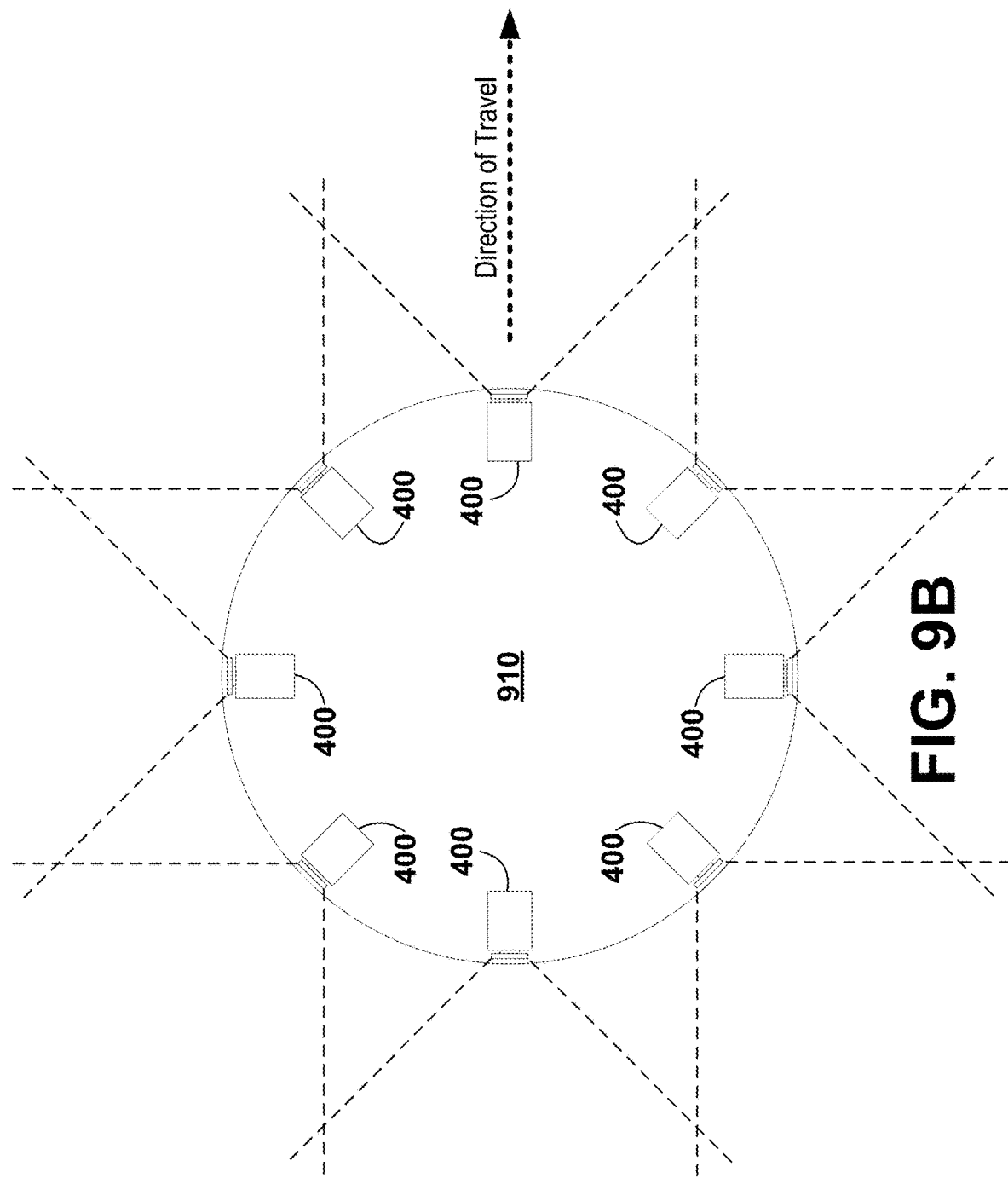
FIG. 9B is an illustration of a camera system, according to example embodiments.

FIG. 9B illustrates an alternative camera system 910 that includes a plurality of camera sub-systems (each camera sub-system including respective image sensors). The camera system 910 may be mounted on a vehicle and images captured by the image sensors of the camera system 910 may be used for object identification and avoidance and/or for navigation. A potential direction of travel of a corresponding vehicle is illustrated in FIG. 9B by a dashed arrow.

FIG. 9B is a top view of the camera system 910. The camera system 910 illustrated includes eight camera systems 400 as illustrated in FIG. 4A, spaced around the periphery of the camera system 910 by angles of between 30° and 60°, for example. The dashed lines in FIG. 9B illustrate possible fields of view for the image sensors in the respective camera systems 400. In some embodiments, the image sensors in the camera systems 400 may have fields of view of between 80° and 100°. Thus, the fields of view of the camera systems 400 may overlap. As illustrated, camera systems, and corresponding image sensors, may be assembled in a ring formation. The ring formation may be designed such that the angle and orientation of each individual camera system, and corresponding image sensors, is positioned correctly to eliminate blind spots. Thus, the camera systems may work together to form a cohesive, circular vision of the surrounding scene. In alternate embodiments, the fields of view for each of the camera systems 400 may be different (e.g., 15°, 30°, 45°, 60°, 75°, 105°, 120°, 135°, 150°, 165°, 180°, 195°, 210°, 225°, 240°, 255°, 270°, 285°, 300°, 315°, 330°, 345°, or 360°). In other embodiments, the camera systems, and corresponding image sensors, may be assembled in non-ring formations (e.g., with camera systems at the corners of a vehicle's roof).

Further, in some embodiments, multiple types of camera systems may be used (e.g., rather than eight instances of a single type of camera system). The different camera systems may each have different corresponding fields of view. Additionally, in alternate embodiments, a minimum number of camera systems 400 may be used to span the periphery of the vehicle. For example, if the camera systems 400 used are all the same as one another, as in FIG. 9B, and each includes image sensors that have a field of view between 80° and 100°, only four camera systems may be included in the camera system 910 (e.g., 360° divided by 90° corresponds to four camera systems).

Figure 9C:
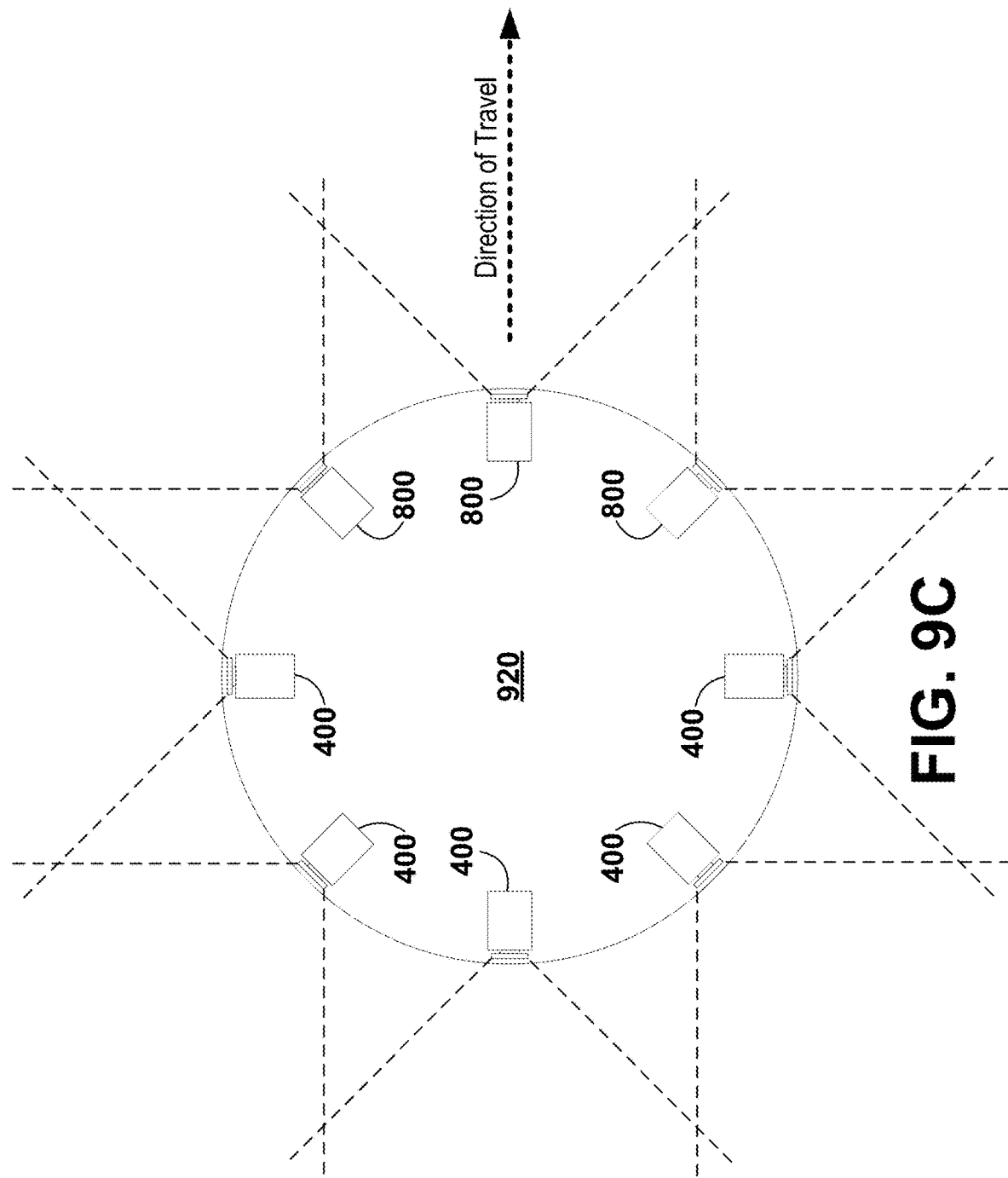
FIG. 9C is an illustration of a camera system, according to example embodiments.

In some embodiments, it may be more crucial to detect and avoid objects in front of the vehicle (i.e., in the direction of travel) rather than behind the vehicle or adjacent to the vehicle (e.g., perpendicular to the direction of travel). As such, one example camera system 920, as illustrated in FIG. 9C, may include additional image sensors on the front-facing portion of the camera system 920. As illustrated in FIG. 9C, the three front-facing camera sub-systems may each be the camera system 800 illustrated in FIG. 8A. As illustrated in FIG. 8A, the camera systems 800 include three image sensors, one of which may be configured to sense low-luminance objects (e.g., a black cat on at night). In this way, the object detection and avoidance capabilities of the camera system 920 illustrated in FIG. 9C may be improved when compared with the camera system 910 illustrated in FIG. 9B.

Figure 9D:
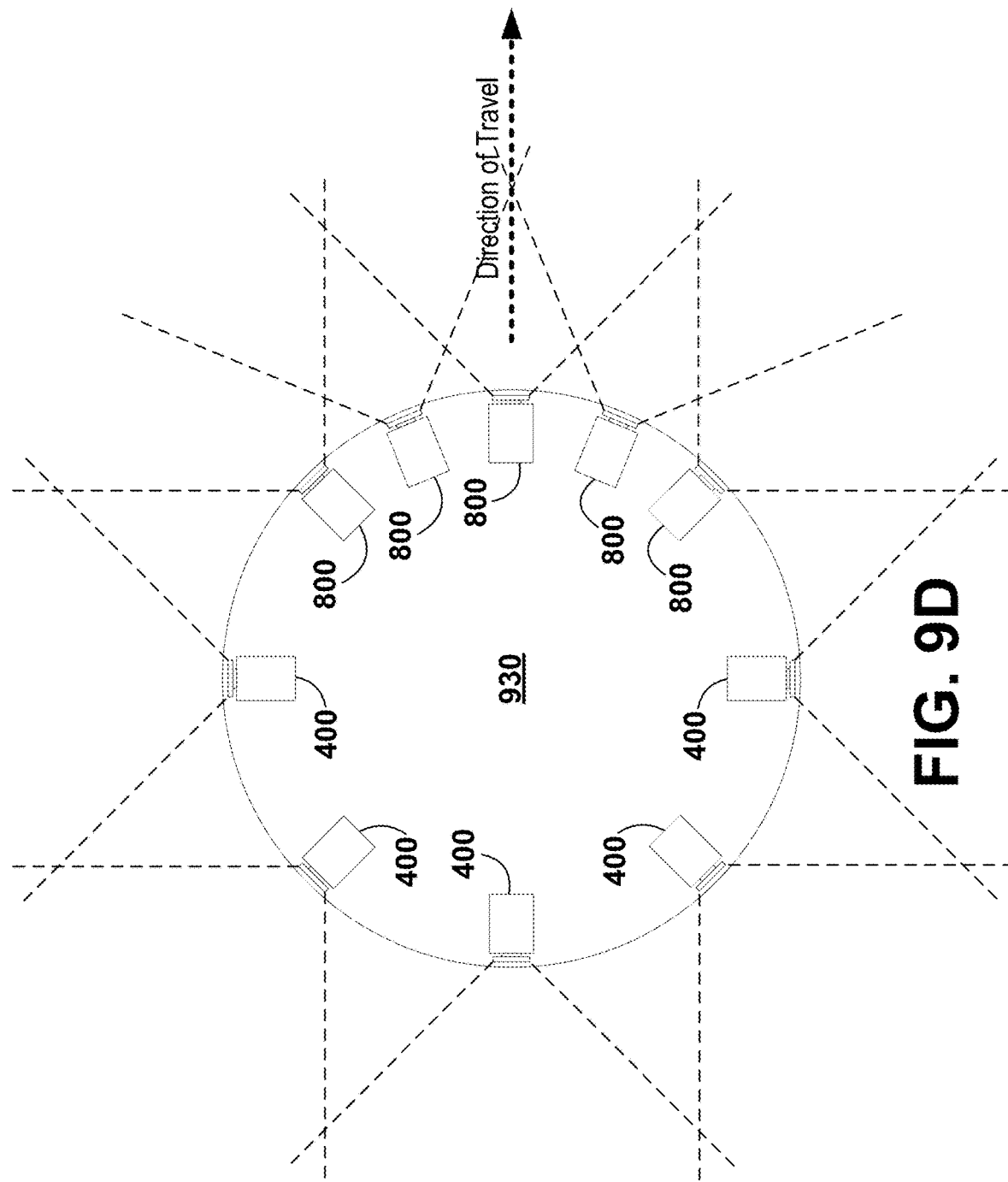
FIG. 9D is an illustration of a camera system, according to example embodiments.

Another possible embodiment in which additional image sensors are included on the front-facing portion of the vehicle is a camera system 930 as illustrated FIG. 9D. As illustrated, the front-facing portion of the camera system 930 includes additional camera sub-systems (e.g., at angles of between 20° and 25° and between −20° and −25°, in addition to at angles between 40° and 50° and between −40° and −50°, relative to the direction of travel) when compared with the camera systems 910, 920 illustrated in FIGS. 9B and 9C. Also as illustrated, in addition to having additional front-facing camera sub-systems, the front-facing camera sub-systems may include low-light image sensors (e.g., the third image sensor 830 in the camera system 800 illustrated in FIG. 8A). In alternate embodiments, rather than additional camera systems 800 as illustrated in FIG. 8A being included in the front-facing portion of the vehicle, additional camera systems 400 as illustrated in FIG. 4A and/or other additional camera systems may be included in the camera system 930.

IV. EXAMPLE PROCESSES

Figure 10:
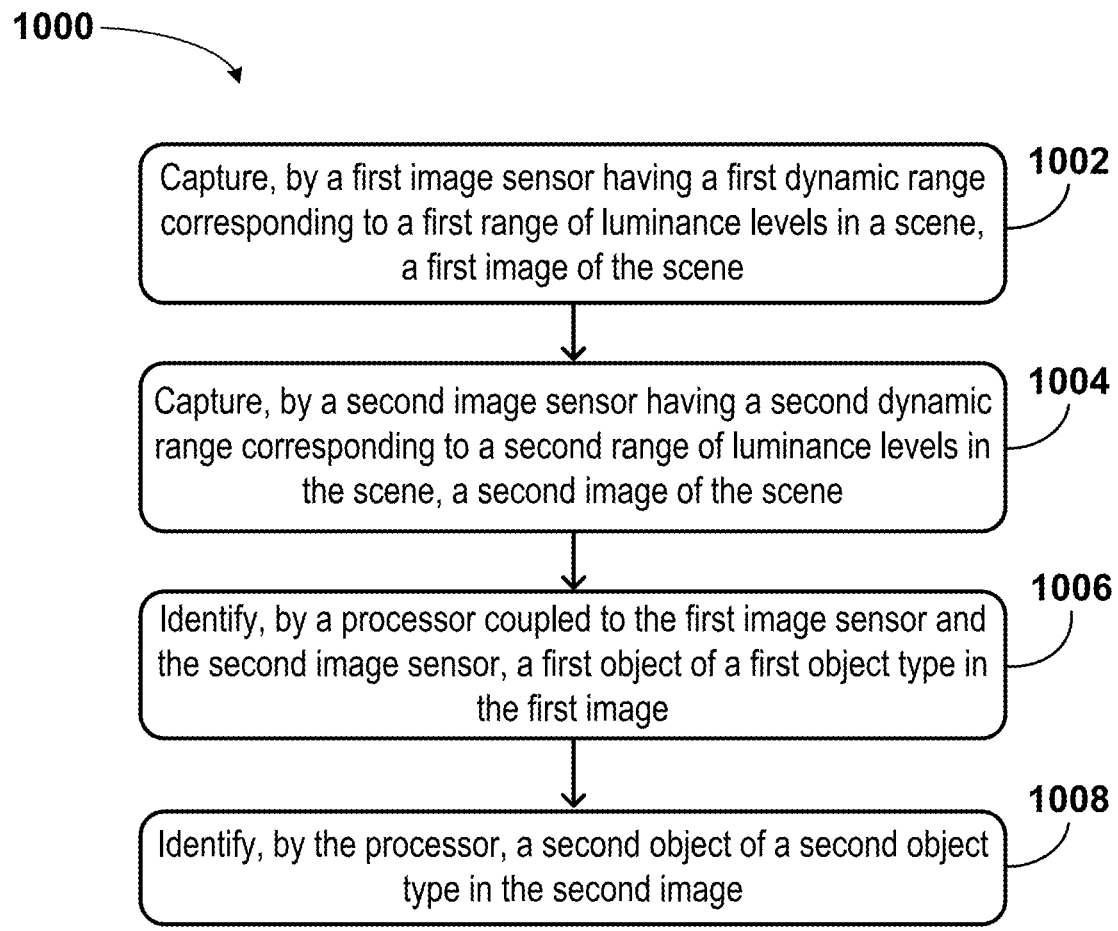
FIG. 10 is a flowchart diagram of a method, according to example embodiments.

FIG. 10 is a flowchart diagram of a method 1000, according to example embodiments. The method 1000 may be used to detect and/or avoid one or more objects within the environment of an autonomous vehicle using an image sensing system, for example. The method 1000 may be performed using the camera system 400 illustrated in FIG. 4A, for example. In alternate embodiments, the method 1000 may be performed using alternate camera systems.

At block 1002, the method 1000 includes capturing, by a first image sensor having a first dynamic range corresponding to a first range of luminance levels in a scene, a first image of the scene.

At block 1004, the method 1000 includes capturing, by a second image sensor having a second dynamic range corresponding to a second range of luminance levels in the scene, a second image of the scene. The second image sensor captures the second image of the scene via a neutral-density filter. The second range of luminance levels includes luminance levels that are higher than the first range of luminance levels.

At block 1006, the method 1000 includes identifying, by a processor coupled to the first image sensor and the second image sensor, a first object of a first object type in the first image. The first object type has an expected luminance within the first range of luminance levels.

At block 1008, the method 1000 includes identifying, by the processor, a second object of a second object type in the second image. The second object type has an expected luminance within the second range of luminance levels.

V. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the Figures, similar symbols typically identify similar components, unless context dictates otherwise. The example embodiments described herein and in the Figures are not meant to be limiting. Other embodiments can be utilized, and other changes can be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The particular arrangements shown in the Figures should not be viewed as limiting. It should be understood that other embodiments can include more or less of each element shown in a given Figure. Further, some of the illustrated elements can be combined or omitted. Yet further, an example embodiment can include elements that are not illustrated in the Figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A camera system, comprising:
   a first image sensor having a first dynamic range corresponding to a first range of luminance levels in a scene;
   a second image sensor having a second dynamic range corresponding to a second range of luminance levels in the scene, wherein the second image sensor receives light from the scene via a neutral-density filter, and wherein the second range of luminance levels includes luminance levels that are higher than the first range of luminance levels; and
   a processor coupled to the first image sensor and the second image sensor, wherein the processor is configured to execute instructions to:
      identify objects of a first object type in a first image of the scene captured by the first image sensor, wherein the first object type has an expected luminance within the first range of luminance levels; and
      identify objects of a second object type in a second image of the scene captured by the second image sensor, wherein the second object type has an expected luminance within the second range of luminance levels.

2. The camera system of claim 1,
   wherein the first image sensor has a variable exposure that is adjusted by a controller executing instructions based on illuminance, and
   wherein the second image sensor has a fixed exposure.

3. The camera system of claim 2, wherein adjusting the variable exposure based on luminance comprises adjusting an exposure duration, an aperture size, a gain level, or an ISO sensitivity of the first image sensor.

4. The camera system of claim 2,
wherein the variable exposure is adjusted by modifying a shutter speed or gain associated with a shutter on the first image sensor,
wherein the first object type comprises:
  objects in motion relative to the camera system and having high velocities relative to the shutter speed; or
  actively illuminated objects that are modulated at faster rates than the shutter speed, and
wherein the second object type comprises:
  objects in motion relative to the camera system and having low velocities or comparable velocities relative to the shutter speed; or
  actively illuminated objects that are modulated at similar or slower rates than the shutter speed.

5. The camera system of claim 1, further comprising a third image sensor having a third dynamic range corresponding to a third range of luminance levels in the scene,
  wherein the processor is coupled to the third image sensor,
  wherein the third range of luminance levels includes at least one luminance level that is lower than the first range of luminance levels, and
  wherein the processor is further configured to execute instructions to identify objects of a third object type in a third image of the scene captured by the third image sensor, wherein the third object type has an expected luminance within the third range of luminance levels.

6. The camera system of claim 5, wherein the third image sensor has a variable exposure that is adjusted by a controller executing instructions based on illuminance.

7. The camera system of claim 6, wherein adjusting the variable exposure based on luminance comprises adjusting an exposure duration, shutter speed, an aperture size, or an ISO sensitivity of the third image sensor.

8. The camera system of claim 1, wherein the first image sensor and the second image sensor are non-overlapping sensor regions of a single image sensor.

9. The camera system of claim 1, further comprising:
a third image sensor having the first dynamic range; and
a fourth image sensor having the second dynamic range,
  wherein the fourth image sensor receives light from a separate perspective of the scene via an additional neutral-density filter,
  wherein the processor is coupled to the third image sensor and the fourth image sensor, and
  wherein the processor is further configured to execute instructions to:
    identify objects of the first object type in a third image of the separate perspective of the scene captured by the third image sensor; and
    identify objects of the second object type in a fourth image of the separate perspective of the scene captured by the fourth image sensor.

10. The camera system of claim 1, further comprising:
a third image sensor having the first dynamic range; and
a fourth image sensor having the second dynamic range,
  wherein the fourth image sensor receives light from a separate perspective of the scene via an additional neutral-density filter,
  wherein the processor is coupled to the third image sensor and the fourth image sensor, and
  wherein the processor is further configured to execute instructions to:
    identify objects of a third object type in a third image of the separate perspective of the scene captured by the third image sensor, wherein the third object type has an expected luminance within the first range of luminance levels; and
    identify objects of a fourth object type in a fourth image of the separate perspective of the scene captured by the fourth image sensor, wherein the fourth object type has an expected luminance within the second range of luminance levels.

11. The camera system of claim 10,
  wherein the third image sensor has a variable exposure that is adjusted by a controller executing instructions based on luminance, and
  wherein the fourth image sensor has a fixed exposure.

12. The camera system of claim 11, wherein adjusting the variable exposure based on luminance comprises adjusting an exposure duration, an aperture size, or an ISO sensitivity of the third image sensor.

13. The camera system of claim 1, wherein the processor is further configured to execute instructions to:
  identify objects of the first object type in the second image of the scene; and
  check for errors in the identified objects of the first object type by comparing the objects of the first object type identified in the first image of the scene and the objects of the first object type identified in the second image of the scene.

14. The camera system of claim 1, further comprising:
a first lens optically coupled to the first image sensor and having a first focal length; and
a second lens optically coupled to the second image sensor and having a second focal length,
  wherein the first focal length is different than the second focal length,
  wherein, correspondingly, the first image of the scene and the second image of the scene are captured at different focal lengths,
  wherein the processor is further configured to execute instructions to generate an image that simulates an image captured by a simulated image sensor having a simulated lens optically coupled thereto, and
  wherein the simulated lens has a focal length between the first focal length and the second focal length.

15. The camera system of claim 1, further comprising:
a first lens optically coupled to the first image sensor and having a first focal length; and
a second lens optically coupled to the second image sensor and having a second focal length,
  wherein the first focal length is different than the second focal length,
  wherein, correspondingly, the first image of the scene and the second image of the scene are captured at different focal lengths, and
  wherein the processor is further configured to execute instructions to:
    identify objects of the first object type in the second image of the scene; and
    determine a distance of one or more objects of the first object type in the scene from the camera system based on:
      the first focal length;
      the second focal length;
      a focus of the one or more objects in the first image of the scene; and
      a focus of the one or more objects in the second image of the scene.

16. The camera system of claim 1, wherein the first image and the second image are captured substantially simultaneously.

17. The camera system of claim 1, wherein the first image sensor and the second image sensor are vertically aligned.

18. The camera system of claim 1, wherein the camera system is mounted on an autonomous vehicle and used for object detection and avoidance.

19. A method, comprising:
- capturing, by a first image sensor having a first dynamic range corresponding to a first range of luminance levels in a scene, a first image of the scene;
- capturing, by a second image sensor having a second dynamic range corresponding to a second range of luminance levels in the scene, a second image of the scene,
- wherein the second image sensor captures the second image of the scene via a neutral-density filter, and
- wherein the second range of luminance levels includes luminance levels that are higher than the first range of luminance levels;
- identifying, by a processor coupled to the first image sensor and the second image sensor, a first object of a first object type in the first image,
- wherein the first object type has an expected luminance within the first range of luminance levels; and
- identifying, by the processor, a second object of a second object type in the second image,
- wherein the second object type has an expected luminance within the second range of luminance levels.

20. A non-transitory, computer-readable medium with instructions stored thereon, wherein the instructions, when executed by a processor, comprise:
- receiving, from a first image sensor having a first dynamic range corresponding to a first range of luminance levels in a scene, a first image of the scene,
- wherein the first image of the scene was captured by the first image sensor;
- receiving, from a second image sensor having a second dynamic range corresponding to a second range of luminance levels in the scene, a second image of the scene,
- wherein the second image of the scene was captured by the second image sensor via a neutral-density filter, and
- wherein the second range of luminance levels includes luminance levels that are higher than the first range of luminance levels;
- identifying a first object of a first object type in the first image,
- wherein the first object type has an expected luminance within the first range of luminance levels; and
- identifying a second object of a second object type in the second image,
- wherein the second object type has an expected luminance within the second range of luminance levels.

* * * * *